(12) United States Patent
Park

(10) Patent No.: US 10,971,958 B2
(45) Date of Patent: *Apr. 6, 2021

(54) METHOD AND APPARATUS FOR PERFORMING COMMUNICATION IN WIRELESS POWER TRANSMISSION SYSTEM

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,069

(22) Filed: Jun. 18, 2020

(65) Prior Publication Data

US 2020/0358322 A1 Nov. 12, 2020

Related U.S. Application Data

(63) Continuation of application No. 16/422,610, filed on May 24, 2019, now Pat. No. 10,862,351.

(30) Foreign Application Priority Data

Mar. 26, 2018 (KR) .......................... 10-2018-0034709

(51) Int. Cl.
*H02J 7/02* (2016.01)
*H02J 50/60* (2016.01)
(Continued)

(52) U.S. Cl.
CPC .............. *H02J 50/80* (2016.02); *H02J 50/10* (2016.02); *H02J 7/025* (2013.01); *H02J 50/40* (2016.02); *H04B 5/0031* (2013.01); *H04B 5/0037* (2013.01)

(58) Field of Classification Search
CPC .... H02J 7/025; H02J 7/00034; H02J 7/00041; H02J 7/00045; H02J 50/10; H02J 50/12;
(Continued)

(56) References Cited

U.S. PATENT DOCUMENTS 10,601,251 B2 3/2020 Keith et al.
2019/0296591 A1* 9/2019 Park ........................ H02J 50/80
(Continued)

*Primary Examiner* — An T Luu
(74) *Attorney, Agent, or Firm* — Birch, Stewart, Kolasch & Birch, LLP

(57) ABSTRACT

A wireless power transmitter includes a power conversion unit configured to transfer wireless power to a wireless power receiver by forming magnetic coupling with the wireless power receiver; and a communication/control unit configured to communicate with the wireless power receiver to control transmission of the wireless power and to perform transmission or reception of data, wherein the communication/control unit further configured to set a target power level based on an operation condition, receive, from the wireless power receiver, a received power packet (RPP) which informs a value of the wireless power received by the wireless power receiver, transmit a bit pattern to the wireless power receiver in response to the RPP, the bit pattern requesting communication initiated by the wireless power transmitter, and receive, from the wireless power receiver, a response packet to allow the communication initiated by the wireless power transmitter.

18 Claims, 31 Drawing Sheets

(51) Int. Cl.
*H02J 50/80* (2016.01)
*H02J 50/10* (2016.01)
*H04B 5/00* (2006.01)
*H02J 50/40* (2016.01)

(58) Field of Classification Search
CPC ...... H02J 50/40; H02J 50/80; H02J 13/00022; H02J 13/00026
See application file for complete search history.

(56) References Cited

U.S. PATENT DOCUMENTS

2019/0372403 A1* 12/2019 Park ................. H04B 5/0075
2020/0252886 A1* 8/2020 Park ................. H04W 52/286

* cited by examiner

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

|    | b7 | b6 | b5 | b4 | b3 | b2 | b1 | b0 |
|----|----|----|----|----|----|----|----|----|
| B0 | Power Class | | (Target) Guaranteed Power Value | | | | | |
| B1 | Reserved | | Potential Power Value | | | | | |
| B2 | Reserved | | | | | | WPID | Not Res Sens |

FIG. 20

| B0 | | | | | | | | |
|---|---|---|---|---|---|---|---|---|
| | b7 | b6 | b5 | b4 | b3 | b2 | b1 | b0 |
| | Reserved | | Target Power Value | | | | | |

FIG. 21

| B0 | b7 | b6 | b5 | b4 | b3 | b2 | b1 | b0 |
|----|----|----|----|----|----|----|----|----|
|    | Response |||||||||

FIG. 22

| b7 | b6 | b5 | b4 | b3 | b2 | b1 | b0 |
|----|----|----|----|----|----|----|----|
|    |    |    |    | Response |    |    |    |
| B0 |    |    |    |    |    |    |    |

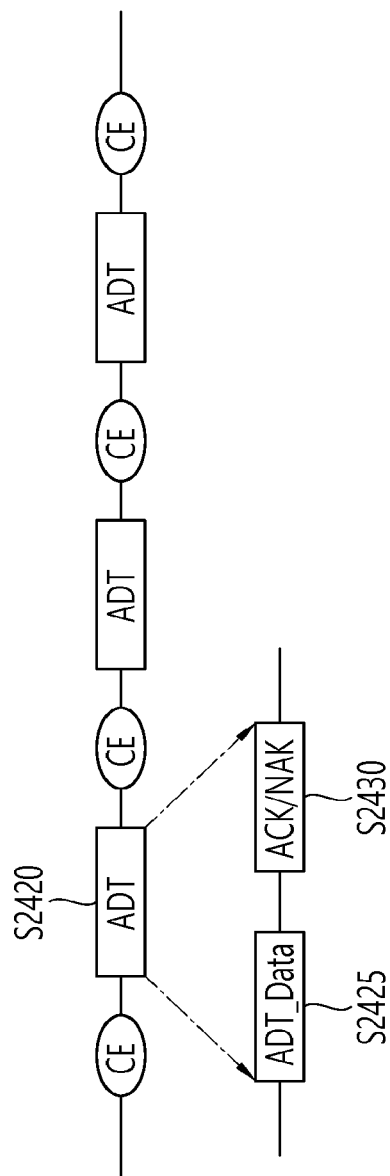

FIG. 26

| b7 | b6 | b5 | b4 | b3 | b2 | b1 | b0 |
|----|----|----|----|----|----|----|----|
|    |    |    |    | Request |    |    |    |
| B0 |    |    |    |    |    |    |    |

FIG. 27

| b7 | b6 | b5 | b4 | b3 | b2 | b1 | b0 |
|----|----|----|----|----|----|----|----|
| B0 | Reason for Attention request | | | | | | |

FIG. 28

| b7 | b6 | b5 | b4 | b3 | b2 | b1 | b0 |
|----|----|----|----|----|----|----|----|
|    |    |    |    ACK/NAK |    |    |    |    |
| B0 |    |    |    |    |    |    |    |

FIG. 29

| b7 | b6 | b5 | b4 | b3 | b2 | b1 | b0 |
|----|----|----|----|----|----|----|----|
|    |    |    | SOD/EOD |    |    |    |    |
| B0 |    |    |    |    |    |    |    |

METHOD AND APPARATUS FOR PERFORMING COMMUNICATION IN WIRELESS POWER TRANSMISSION SYSTEM

CROSS REFERENCE TO RELATED APPLICATION

This application is a Continuation of U.S. application Ser. No. 16/422,610, filed on May 24, 2019, which claims the benefit under 35 U.S.C. § 119(a) to Korean Patent Application No. 10-2018-0034709, filed in the Republic of Korea on Mar. 26, 2018, all of these applications are hereby expressly incorporated by reference into the present application.

BACKGROUND OF THE INVENTION

Field of the Invention

The present invention relates to a wireless power transmission, and more particularly, to a method and apparatus for performing communication in a wireless power transmission system.

Related Art

The wireless power transfer (or transmission) technology corresponds to a technology that can wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transmission system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

In a communication protocol between a wireless power transmission apparatus and a reception apparatus, in the case that a sender or a master that initiates or leads a communication is the reception apparatus, the wireless power transmission apparatus may transmit only a response to a request of the wireless power reception apparatus. In this case, even in the case that the wireless power transmission apparatus detects foreign substances in a charging area (or magnetic field area) or charging environment is changed, the wireless power transmission apparatus is unable to adjust a power level actively on a desired timing and unable to perform an authentication.

Accordingly, a method and apparatus for performing efficient and safe power management and authentication is required such that a wireless power transmission apparatus is available to obtain status and authority as a master/transmitter depending on a situation, and current ambient situation/environment is reflected in real time.

SUMMARY OF THE INVENTION

The present invention provides a method and apparatus for performing a communication in a wireless power transmission system.

The present invention also provides a method and wireless power transmission apparatus for performing a communication in a wireless power transmission system.

The present invention also provides a method and wireless power reception apparatus for performing a communication in a wireless power transmission system.

According to an aspect of the present invention, a wireless power transmission apparatus is provided. The apparatus includes a communication/control unit configured to perform a negotiation for a first available power indicator with a wireless power reception apparatus and a power conversion unit configured to transmit a wireless power to the wireless power reception apparatus by generating magnetic coupling in a primary coil according to the first available power indicator. Here, the communication/control unit is configured to: receive a received power packet indicating a power received by the wireless power reception apparatus from the wireless power reception apparatus, transmit a bit pattern response requesting a communication by the wireless power transmission apparatus to the wireless power reception apparatus, receive a response signal indicating being ready to receive the communication by the wireless power transmission apparatus from the wireless power reception apparatus, and transmit a packet related to a second available power indicator to the wireless power reception apparatus.

In an aspect, the first available power indicator and the second available power indicator may be guaranteed power.

In another aspect, the first available power indicator and the second available power indicator may be target power.

In still another aspect, the packet related to the second available power may include a capability packet of the wireless power transmission apparatus.

In still another aspect, the bit pattern response may indicate to request an authority acquisition that the wireless power transmission apparatus is available to transmit a predetermined packet to the wireless power reception apparatus.

In still another aspect, the bit pattern response is defined with a different pattern from a bit pattern for ACK response, NAK response and ND response indicating the request is not valid.

According to another aspect of the present invention, a wireless power transmission method is provided. The method includes performing a negotiation for a first available power indicator with a wireless power reception apparatus, transmitting a wireless power to the wireless power reception apparatus by generating magnetic coupling in a primary coil according to the first available power indicator, receiving a received power packet indicating a power received by the wireless power reception apparatus from the wireless power reception apparatus, transmitting a bit pattern response requesting a communication by the wireless power transmission apparatus to the wireless power reception apparatus, receiving a response signal indicating being ready to receive the communication by the wireless power transmission apparatus from the wireless power reception apparatus, and transmitting a packet related to a second available power indicator to the wireless power reception apparatus.

According to still another aspect of the present invention, a wireless power reception apparatus is provided. The apparatus includes a communication/control unit configured to perform a negotiation for a first available power indicator with a wireless power transmission apparatus and a power pickup unit configured to receive a wireless power from the wireless power transmission apparatus through magnetic coupling generated in a primary coil according to the first available power indicator. Here, the communication/control unit is configured to: transmit a received power packet related to the received wireless power to the wireless power transmission apparatus, receive a bit pattern response requesting a communication by the wireless power transmission apparatus from the wireless power transmission apparatus, transmit a response signal indicating being ready to perform the communication by the wireless power transmission apparatus to the wireless power transmission apparatus, and receive a packet related to a second available power indicator from the wireless power transmission apparatus.

According to still another aspect of the present invention, a wireless power reception method is provided. The method includes performing a negotiation for a first available power indicator with a wireless power transmission apparatus, receiving a wireless power from the wireless power transmission apparatus through magnetic coupling generated in a primary coil according to the first available power indicator, transmitting a received power packet related to the received wireless power to the wireless power transmission apparatus, receiving a bit pattern response requesting a communication by the wireless power transmission apparatus from the wireless power transmission apparatus, transmitting a response signal indicating being ready to perform the communication by the wireless power transmission apparatus to the wireless power transmission apparatus, and receiving a packet related to a second available power indicator from the wireless power transmission apparatus.

According to the present invention, there is an effect that a wireless power transmission apparatus can adjust an available power indicator dynamically on a desired timing depending on ambient environment/situation and initiate a communication and an authentication autonomously.

BRIEF DESCRIPTION OF THE DRAWINGS

FIG. 10 is a structure of a sync pattern according to an exemplary embodiment of the present invention.

FIG. 18 illustrates a packet structure according to an embodiment.

FIG. 19 illustrates a structure of the capability packet of the wireless power transmission apparatus including an available power indicator according to an embodiment.

FIG. 20 illustrates a structure of the target power packet of the wireless power transmission apparatus according to an embodiment.

FIG. 21 illustrates a structure of the response packet of the wireless power reception apparatus according to an embodiment.

FIG. 22 illustrates a structure of the response packet of the wireless power transmission apparatus according to an embodiment.

FIG. 24b illustrates an ATX (or ATD) step performing the auxiliary transport in detail according to another embodiment.

FIG. 26 is an example of GR packet.

FIG. 27 is an example of RA packet.

FIG. 28 is an example of ACK packet.

FIG. 29 is an example of SOD/EOD packet.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
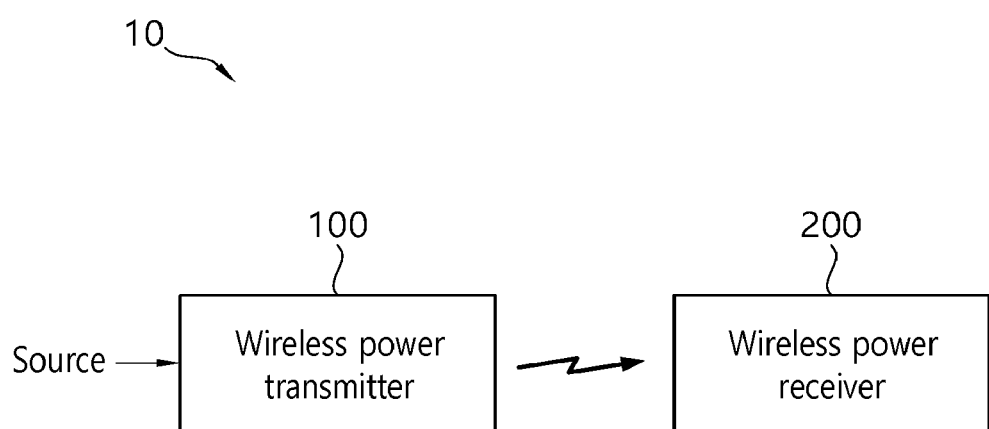
FIG. 1 is a block diagram of a wireless power system (10) according to an exemplary embodiment of the present invention.

FIG. 1 is a block diagram of a wireless power system (10) according to an exemplary embodiment of the present invention.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
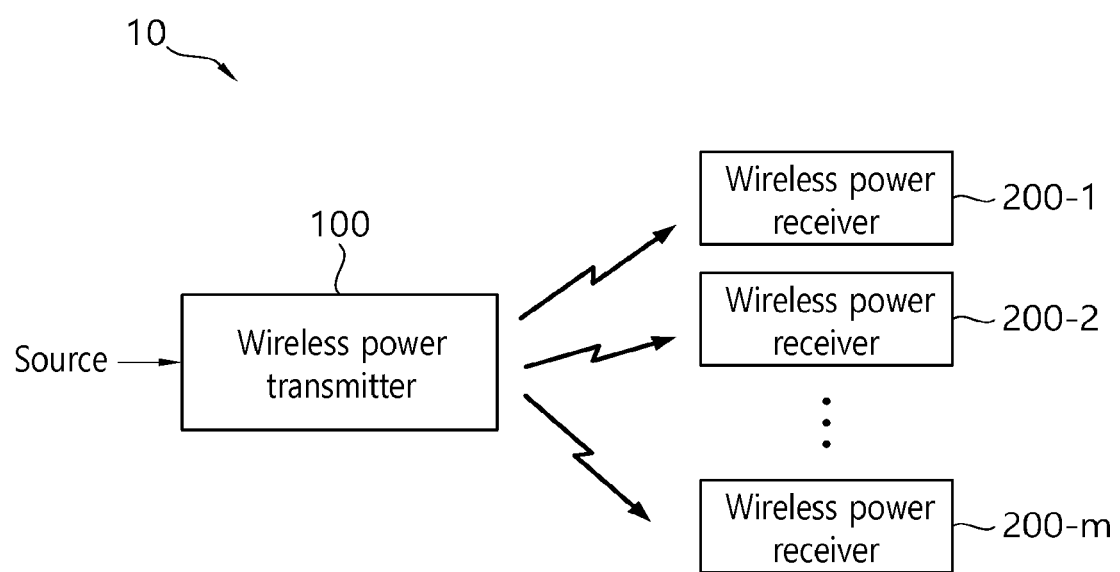
FIG. 2 is a block diagram of a wireless power system (10) according to another exemplary embodiment of the present invention.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transfer distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
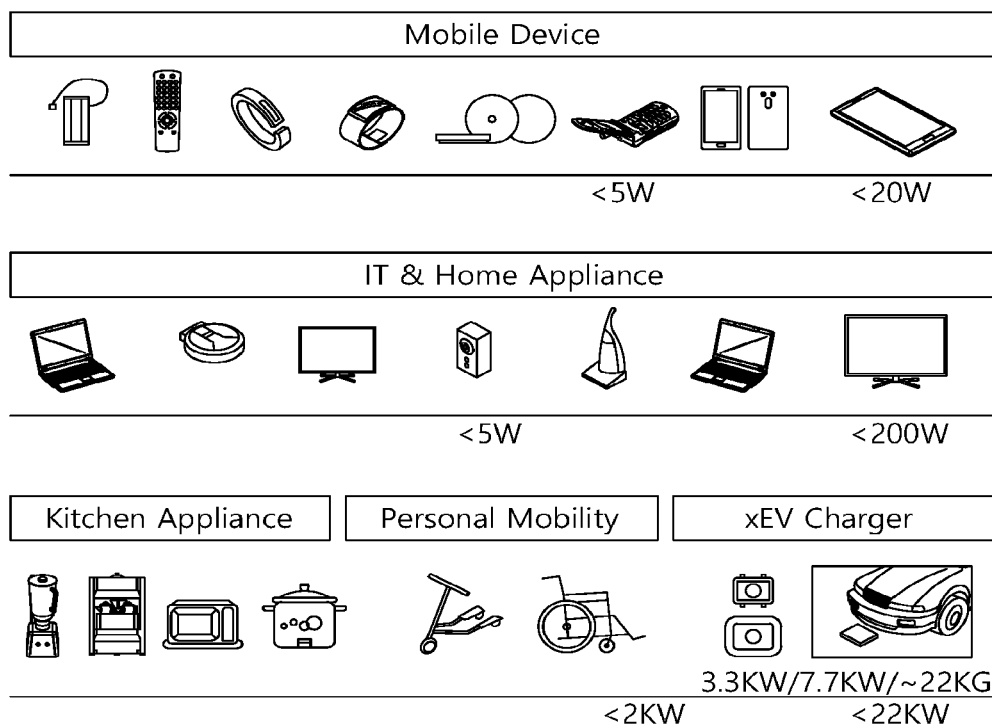
FIG. 3 shows an exemplary embodiment of diverse electronic devices adopting a wireless power transmission system.

FIG. 3 shows an exemplary embodiment of diverse electronic devices adopting a wireless power transmission system.

As shown in FIG. 3, the electronic devices included in the wireless power transmission system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present invention will be described based on a mobile device adopting the wireless power charging method, this is merely exemplary. And, therefore, it shall be understood that the wireless charging method according to the present invention may be applied to diverse electronic devices.

The wireless power transmitter and the wireless power receiver may provide a highly convenient user experience and user experience (UX/UI). More specifically, a smart wireless charging service may be provided. The smart wireless charging service may be implemented based on the UX/UI of a smartphone including a wireless power transmitter. For such application, an interface between the processor and the wireless power receiver of the smartphone authorizes a "drop and play" two-way communication between the wireless power transmitter and the wireless power receiver.

For example, the user may experience a smart wireless charging service in a hotel. When the user enters his (or her) room and places his (or her) smartphone on a wireless charger, which is provided in the hotel room, the wireless charging device transmits wireless power to the smartphone, and the smartphone receives the transmitted wireless power. During this process, information related to the wireless charging service is transmitted to the smartphone. If the smartphone detects that it is being placed on a wireless charger, if the smartphone detects the reception of wireless power, or if the smartphone detects receives information related to a smart wireless charging service from the wireless charger, the smartphone enters a phase (or state) of inquiring an agreement (opt-in) to an additional feature. For this, the smartphone may display a message on a screen by using a method that includes an alarm tone or by using a method that does not include an alarm tone. An example of the message may include phrases, such as "Welcome to ### hotel. Select "Yes" to activate smart charging functions: Yes|No Thanks." The smartphone receives the user input selecting any one of Yes and No Thanks, and the next procedure that is selected by the user is performed. If Yes is selected, the smartphone transmits the corresponding information to the wireless charger. Thereafter, the smartphone and the wireless charger collectively perform the smart charging function.

The smart wireless charging service may also include receiving an automatic input Wi-Fi credentials. For example, the wireless charger transmits Wi-Fi credentials to the smartphone, and the smartphone executes a suitable application and automatically inputs the Wi-Fi credentials that are received from the wireless charger.

The smart wireless charging service may also include executing a hotel application providing hotel promotion information, performing remote controlled check-in/check-out, or acquiring contact information.

As another example, the user may experience a smart wireless charging service in a car. When the user gets in a car (or vehicle) and places his (or her) smartphone on a wireless charger, which is provided in the vehicle, the wireless charging device transmits wireless power to the smartphone, and the smartphone receives the transmitted wireless power. During this process, information related to the wireless charging service is transmitted to the smartphone. If the smartphone detects that it is being placed on a wireless charger, if the smartphone detects the reception of wireless power, or if the smartphone detects receives information related to a smart wireless charging service from the wireless charger, the smartphone enters a phase (or state) of inquiring the identity of the user.

In this state, the smartphone may be automatically connected to the vehicle via Wi-Fi or Bluetooth. Then, the smartphone may display a message on a screen by using a method that includes an alarm tone or by using a method that does not include an alarm tone. An example of the message may include phrases, such as "Welcome to your car. Select "Yes" to synch device with in-car controls: Yes|No Thanks." The smartphone receives the user input selecting any one of Yes and No Thanks, and the next procedure that is selected by the user is performed. If Yes is selected, the smartphone transmits the corresponding information to the wireless charger. Thereafter, by operating an application/display software within the vehicle, the smartphone and the wireless charger may collectively perform a smart control function within the vehicle. The user may enjoy listening to music as desired and may also confirm his (or her) regular map location. An application/display software within the vehicle may include a capability of providing synchronized access for pedestrians.

As yet another example, the user may experience a smart wireless charging service in his (or her) home. When the user enters his (or her) room at home and places his (or her) smartphone on a wireless charger, the wireless charging device transmits wireless power to the smartphone, and the smartphone receives the transmitted wireless power. During this process, information related to the wireless charging service is transmitted to the smartphone. If the smartphone detects that it is being placed on a wireless charger, if the smartphone detects the reception of wireless power, or if the smartphone detects receives information related to a smart wireless charging service from the wireless charger, the smartphone enters a phase (or state) of inquiring an agreement (opt-in) to an additional feature. For this, the smartphone may display a message on a screen by using a method that includes an alarm tone or by using a method that does not include an alarm tone. An example of the message may include phrases, such as "Hi xxx, Would you like to activate night mode and secure the building?: Yes|No Thanks." The smartphone receives the user input selecting any one of Yes and No Thanks, and the next procedure that is selected by the user is performed. If Yes is selected, the smartphone transmits the corresponding information to the wireless charger. Thereafter, the smartphone and the wireless charger at least acknowledges (or recognizes) a pattern of the user and may recommend the user to lock the doors and windows or to turn off the lights, or to set up an alarm.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OBB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and IB is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transmission/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transmission/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

According to the above-described exemplary embodiment of the present invention, in the wireless power transmitting method and wireless power transmitter, or in the wireless power receiving method and wireless power receiver, not all of the configuration elements or process steps are mandatory. And, therefore, all or part of the above-described configuration elements or process steps of the wireless power transmitting method and wireless power transmitter or the wireless power receiving method and wireless power receiver may be included and performed. Additionally, the exemplary embodiments of the wireless power transmitting method and wireless power transmitter or the wireless power receiving method and wireless power receiver may be performed and implemented by being combined with one another. Furthermore, each of the above-described configuration elements or process steps is not mandatorily required to be performed in accordance with the above-described order. And, therefore, it may be possible to perform a process step that was described later prior to a process step, which has been described above to precede the later process.

Hereinafter, 'profiles' will be newly defined based on indexes/reference standards representing/indicating the compatibility. More specifically, it may be understood that by maintaining compatibility between wireless power transmitters and receivers having the same 'profile', stable power transmission/reception may be performed, and that power transmission/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OOB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to $n^{th}$ profile, and a new profile may be added/replaced in accordance with the WPC standard and the exemplary embodiment.

In case the profile is defined as described above, the wireless power transmitter may optionally perform power transmission only to the wireless power receiving corresponding to the same profile as the wireless power transmitter, thereby being capable of performing a more stable power transmission. Additionally, since the load (or burden) of the wireless power transmitter may be reduced and power transmission is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
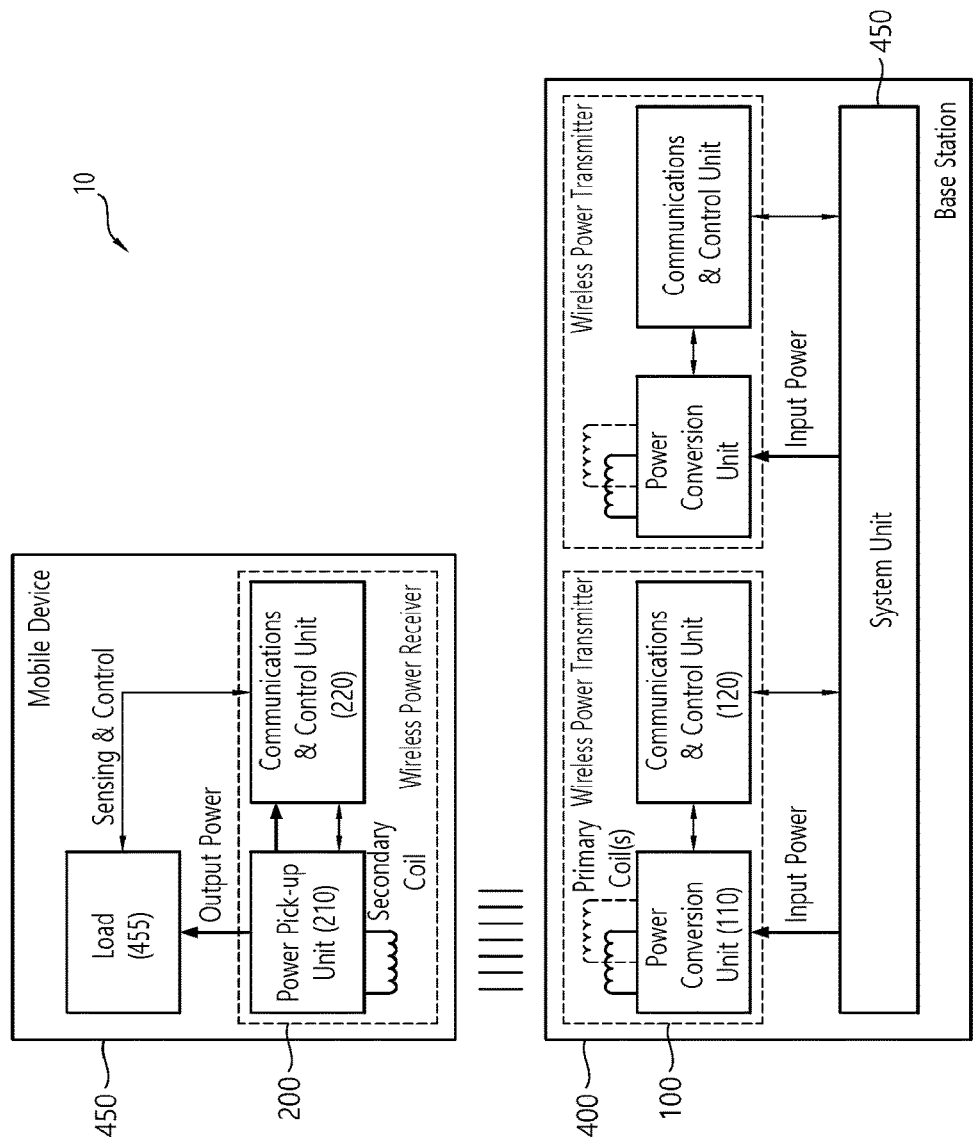
FIG. 4 is a block diagram of a wireless power transmission system according to another exemplary embodiment of the present invention.

FIG. 4 is a block diagram of a wireless power transmission system according to another exemplary embodiment of the present invention.

Referring to FIG. 4, the wireless power transmission system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in anon-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a primary core, a primary winding, a primary loop antenna, and so on. Meanwhile, the secondary coil may also be referred to as a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OOB communication module.

The IB communication module may transmit and/or receive information by using a magnetic wave, which uses a specific frequency as its center frequency. For example, the communications & control unit (120) may perform in-band (TB) communication by loading information in the magnetic wave and by transmitting the information through the primary coil or by receiving a magnetic wave carrying information through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operation point, the communications & control unit (120) may control the transmitted power. The operation point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that can execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
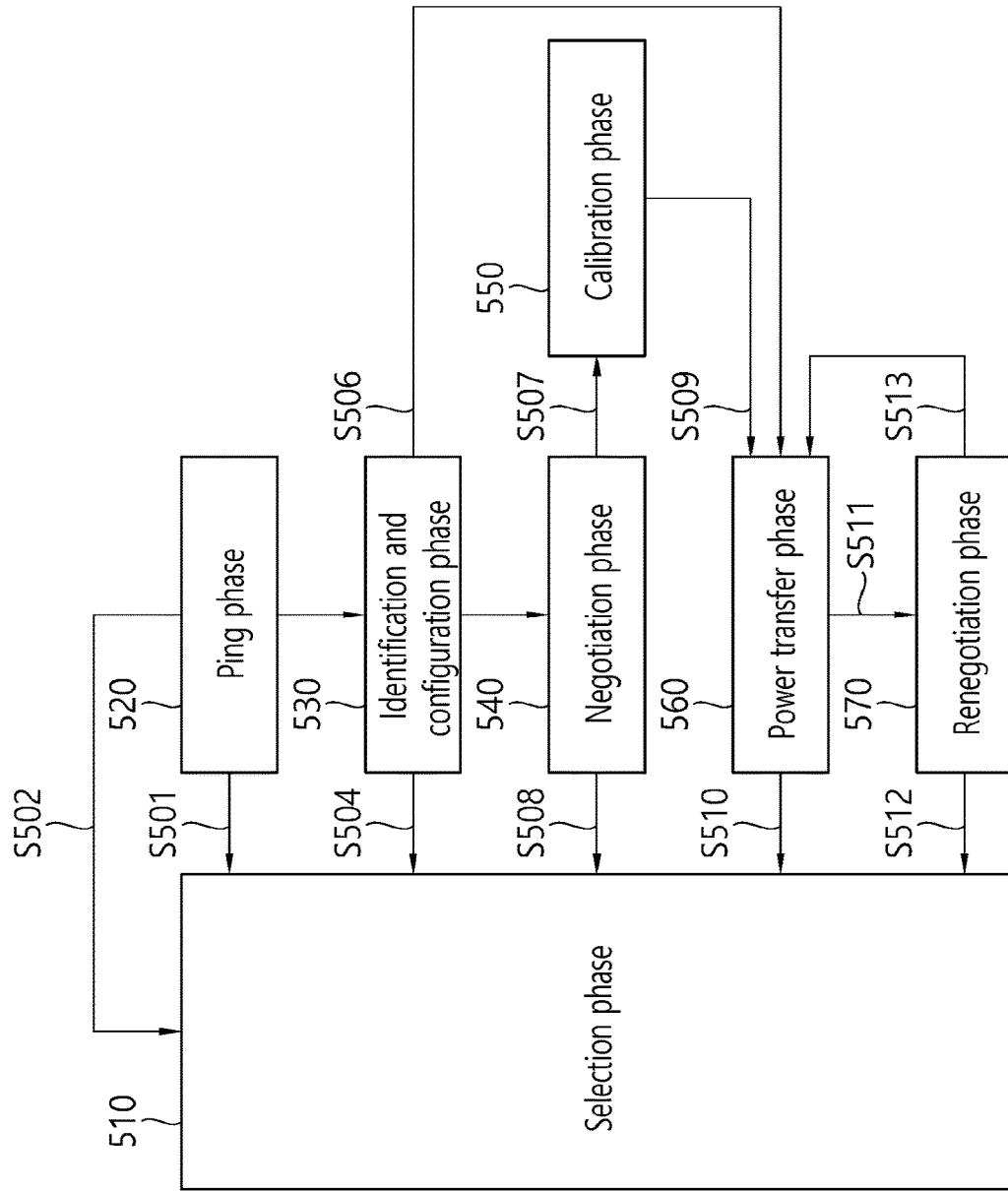
FIG. 5 is a state transition diagram for describing a wireless power transfer procedure.

FIG. 5 is a state transition diagram for describing a wireless power transfer procedure.

Referring to FIG. 5, the power transmission (or transfer) from the wireless power transmitter to the wireless power receiver according to an exemplary embodiment of the present invention may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)-reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having an extremely short pulse and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transmission coil and/or resonance capacitor). According to the exemplary embodiment of the present invention, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value-in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present invention, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet-from the receiver, the process may be shifted back to the selection phase (510). Additionally, in the ping phase (520), if the wireless power transmitter receives a signal indicating the completion of the power transfer—e.g., charging complete packet-from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present invention will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present invention will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present invention may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

The above-described power transfer contract may be configured based on the status and characteristic information of the wireless power transmitter and receiver. For example, the wireless power transmitter status information may include information on a maximum amount of transmittable power, information on a maximum number of receivers that can be accommodated, and so on. And, the receiver status information may include information on the required power, and so on.

Figure 6:
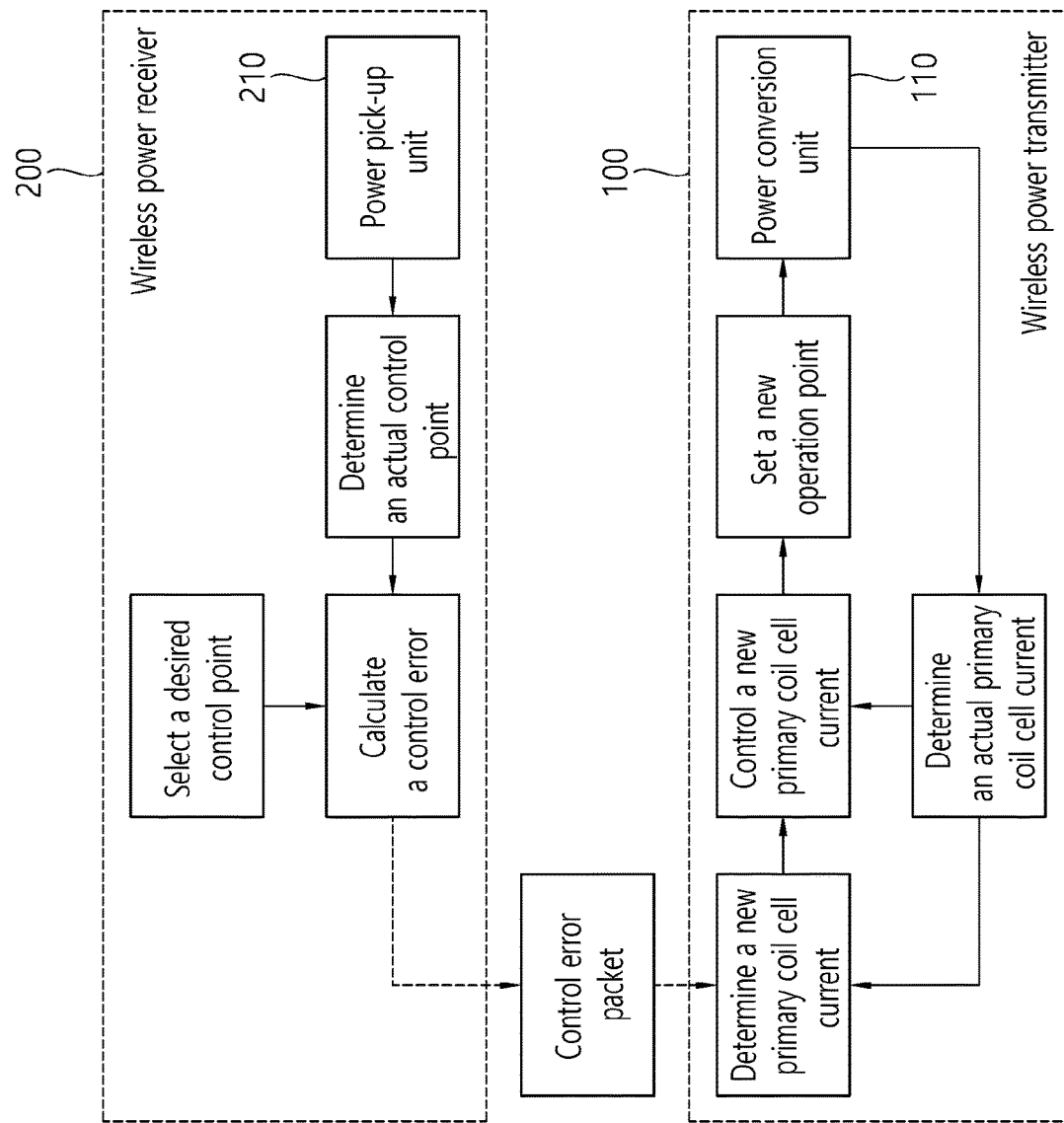
FIG. 6 shows a power control method according to an exemplary embodiment of the present invention.

FIG. 6 shows a power control method according to an exemplary embodiment of the present invention.

As shown in FIG. 6, in the power transfer phase (560), by alternating the power transmission and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operation point-amplitude, frequency, and duty cycle-by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present invention, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
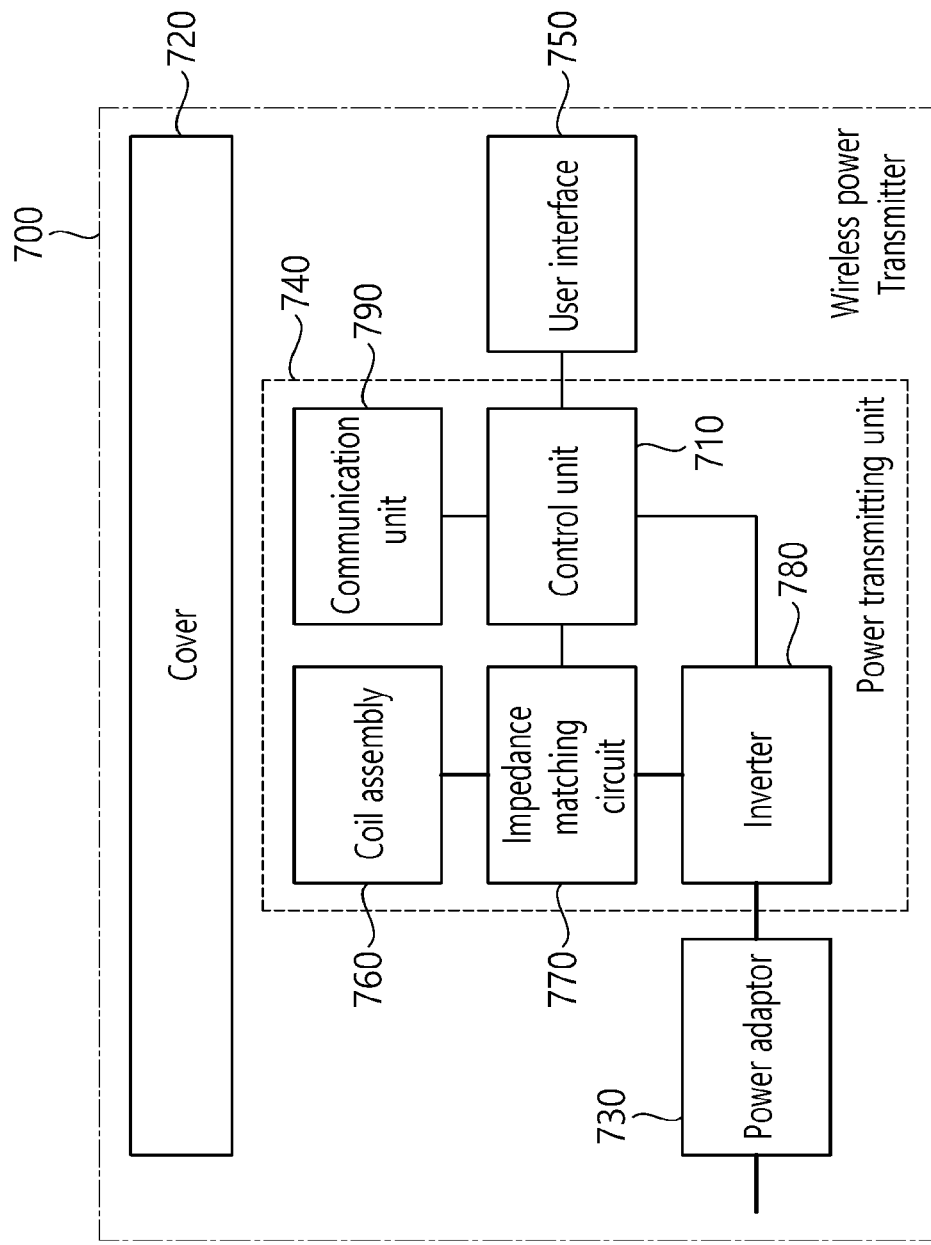
FIG. 7 is a block diagram of a wireless power transmitter according to another exemplary embodiment of the present invention.

FIG. 7 is a block diagram of a wireless power transmitter according to another exemplary embodiment of the present invention. This may belong to a wireless power transmission system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data can be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operation point. The operation point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
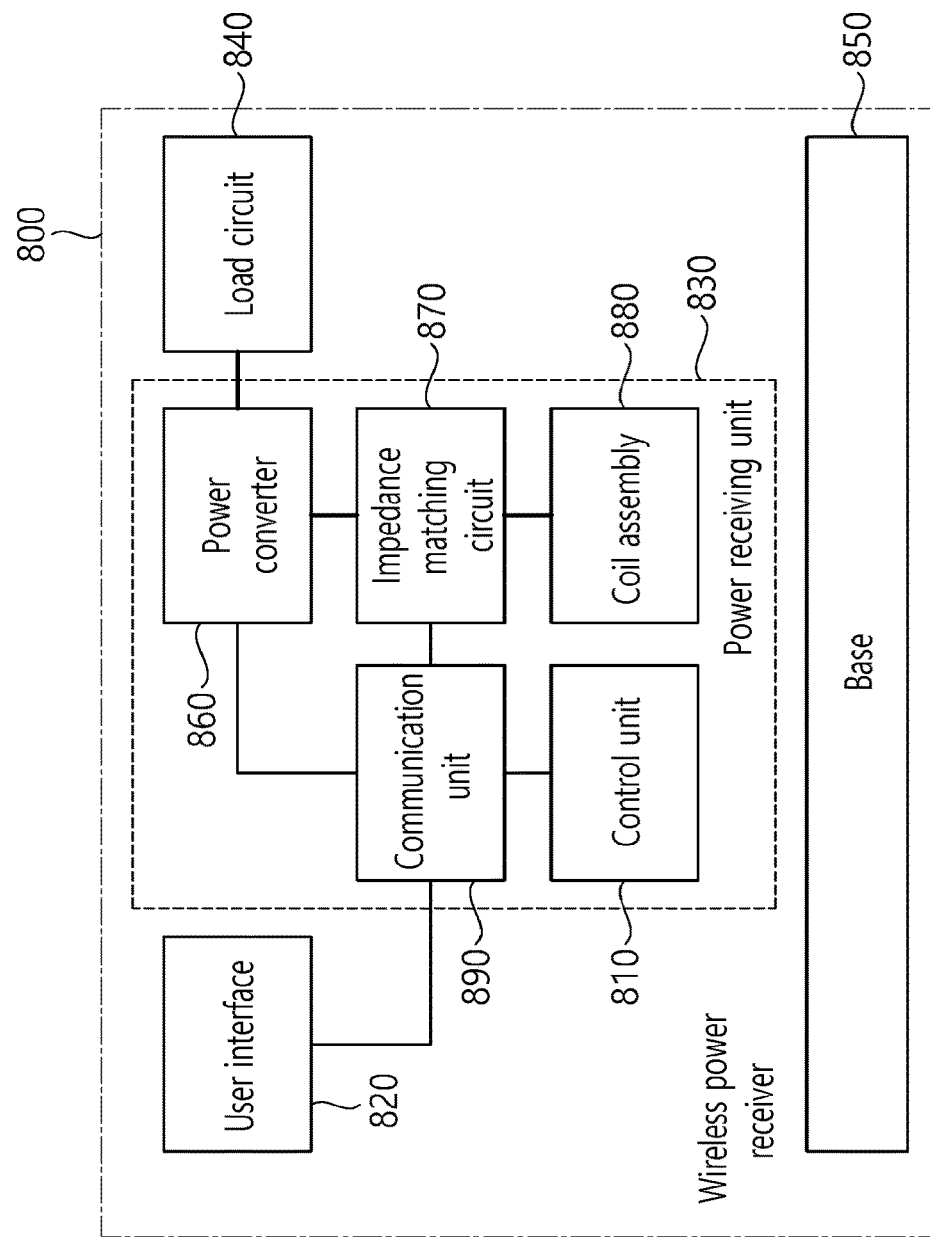
FIG. 8 shows a wireless power receiver according to another exemplary embodiment of the present invention.

FIG. 8 shows a wireless power receiver according to another exemplary embodiment of the present invention. This may belong to a wireless power transmission system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which can reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operation point and a desired operation point of the power receiver (830). Thereafter, by performing a request for adjusting the reflected impedance of the power transmitter and/or for adjusting an operation point of the power transmitter, the difference between the actual operation point and the desired operation point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
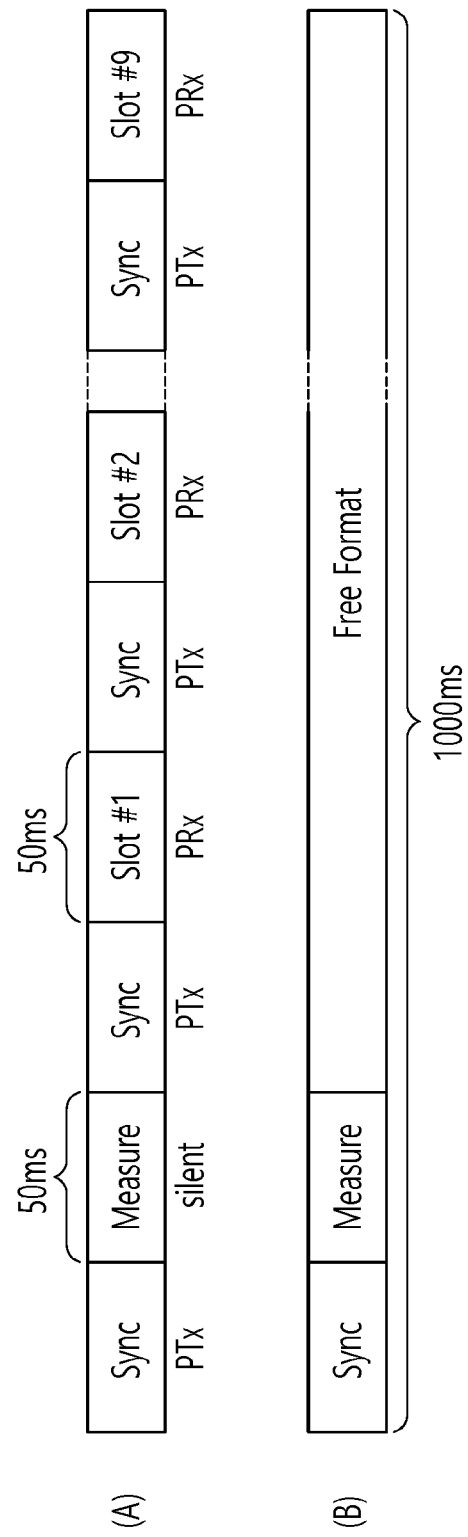
FIG. 9 shows a communication frame structure according to an exemplary embodiment of the present invention.

FIG. 9 shows a communication frame structure according to an exemplary embodiment of the present invention. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present invention.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern can be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '0', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that can be freely used by a random wireless power receiver, the information field is given a value of '10'.

Figure 11:
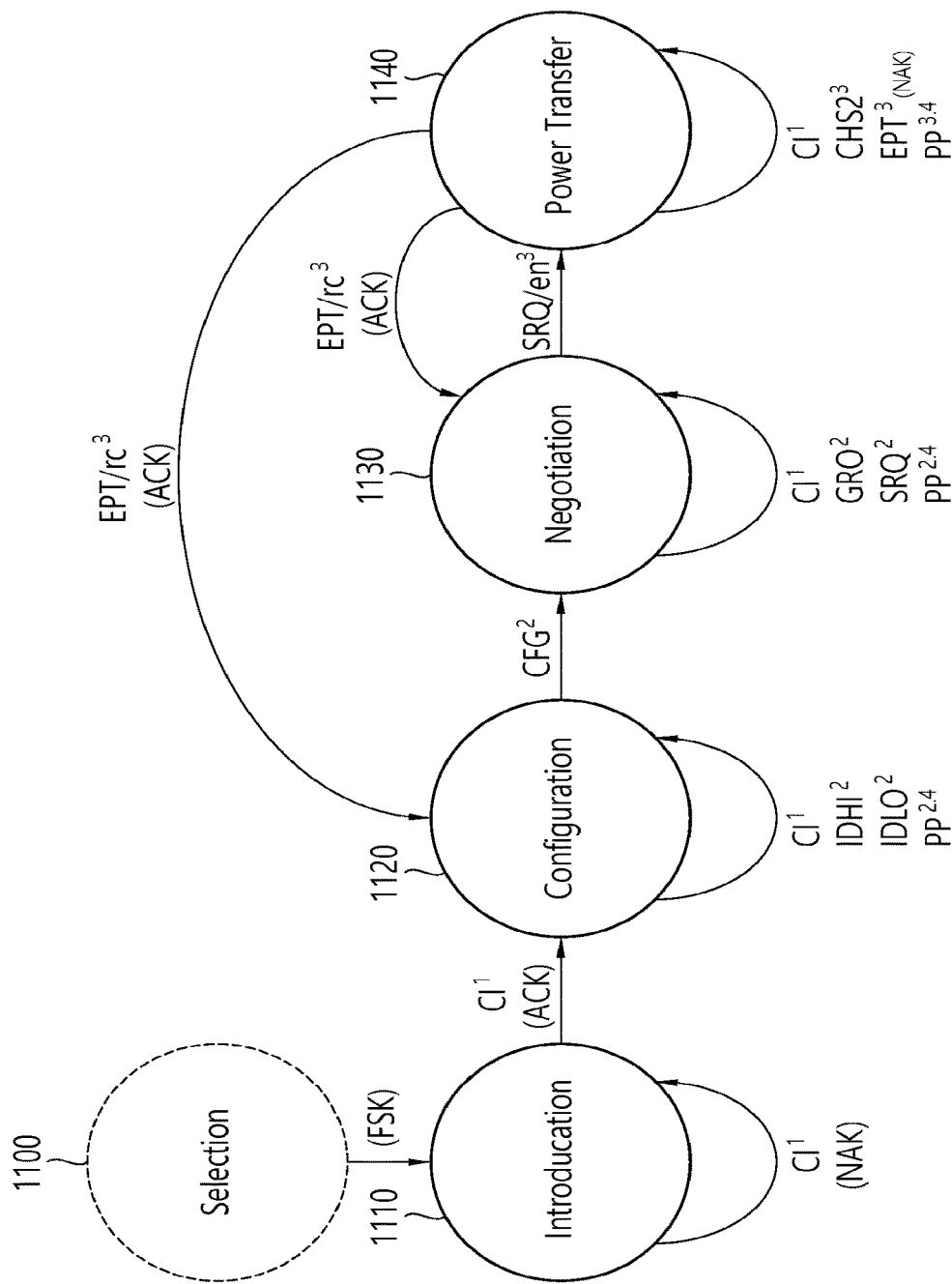
FIG. 11 shows operation statuses of a wireless power transmitter and a wireless power receiver in a shared mode according to an exemplary embodiment of the present invention.

FIG. 11 shows operation statuses of a wireless power transmitter and a wireless power receiver in a shared mode according to an exemplary embodiment of the present invention.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present invention may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power transmitter enters the configuration phase. If the wireless power transmitter transmits a NACK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, it is described a method and wireless power transmission apparatus for performing communication for power management and authentication with the status and authority as a master/transmitter depending on a situation.

1. Definition and Usage of Power Indicator

Figure 12:
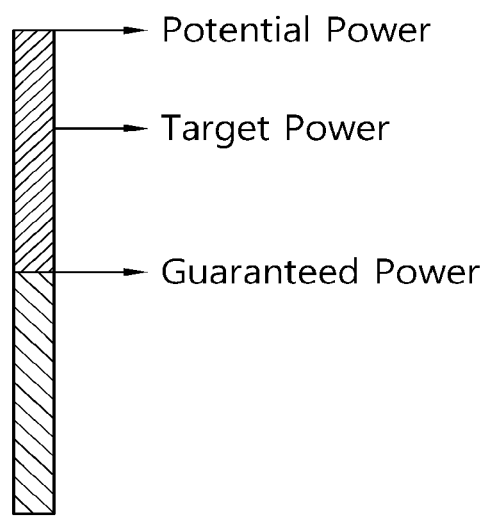
FIG. 12 illustrates an available power indicator according to an example.

FIG. 12 illustrates an available power indicator according to an example.

Referring to FIG. 12, an available power indicator according to an embodiment may mean a power that a wireless power transmission apparatus may provide or transmit to a wireless power reception apparatus as an output in a power transfer phase, and particularly, the available power indicator may include potential power (PP), guaranteed power (GP) and target power (TP).

The potential power may mean output power or an amount of output power of the reference wireless power reception apparatus that the wireless power transmission apparatus is available to make during a power transfer phase. The potential power may be fixed by a design.

The guaranteed power may mean output power or an amount of output power of the reference wireless power reception apparatus that the wireless power transmission apparatus is available to ensure in any time during a power transfer phase. The guaranteed power is negotiated before the power transfer phase but may be maintained fixedly during the power transfer phase. The guaranteed power may be at least 5 W.

The target power may mean output power or an amount of output power of the reference wireless power reception apparatus that the wireless power transmission apparatus provides during a power transfer phase. The target power may be dynamic and changed during the power transfer phase. The supported target power may depend on a condition that the wireless power transmission apparatus operates.

Figure 13:
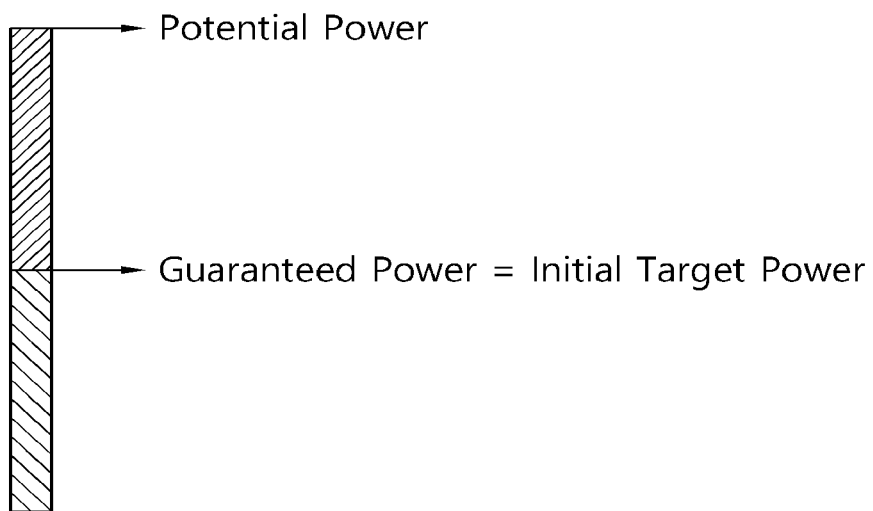
FIG. 13 illustrates a method of each available power indicator being set in a negotiation phase according to an example.

FIG. 13 illustrates a method of each available power indicator being set in a negotiation phase according to an example.

Referring to FIG. 13, the wireless power transmission apparatus reserves an enough margin between the potential power and the guaranteed power. The wireless power transmission apparatus negotiates the guaranteed power for expected operation conditions during the power transfer phase. For example, depending on a design and a market of the wireless power transmission apparatus, the wireless power transmission apparatus may be configured to negotiate the guaranteed power in a level of 50% of the potential power. Such a negotiation of the guaranteed power may be performed by the communication/control unit 120 of FIG. 4 or the control unit 710 of FIG. 7.

Figure 14:
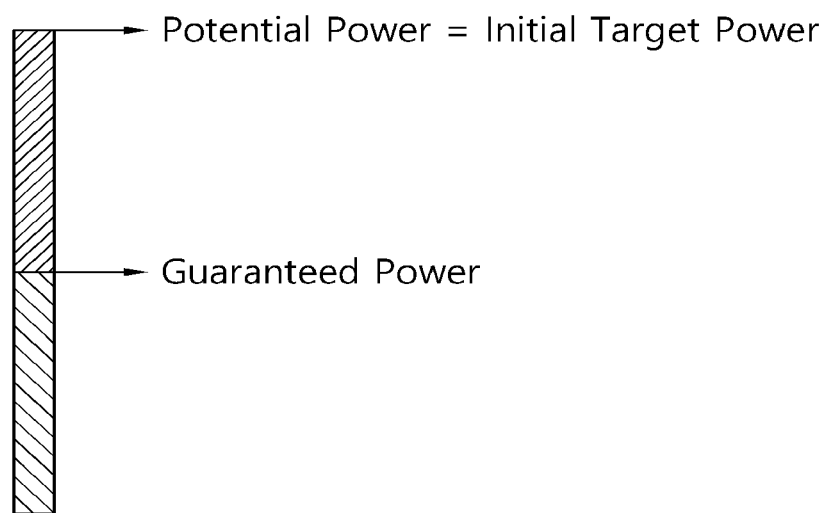
FIG. 14 illustrates a method of each available power indicator being set in a negotiation phase according to another example.

The wireless power transmission apparatus may set the negotiated guaranteed power to an initial target power. The target power may be updated according to an actual power (supported by the wireless power transmission apparatus in a peripheral condition on charging currently) pulled by the wireless power reception apparatus. Meanwhile, the initial target power may also be set by the other method as shown in FIG. 14. Setting of the initial target power may be performed by the communication/control unit 120 of FIG. 4 or the control unit 710 of FIG. 7.

FIG. 14 illustrates a method of each available power indicator being set in a negotiation phase according to another example.

Referring to FIG. 14, the wireless power transmission apparatus may set the potential power to an initial target power. The target power may be updated according to an actual condition. Setting of the initial target power may be performed by the communication/control unit 120 of FIG. 4 or the control unit 710 of FIG. 7.

In the power transfer phase, the wireless power transmission apparatus and the wireless power reception apparatus may perform a power control based on an available power indicator or adjust the available power indicator if it is required. Hereinafter, the power control or the adjustment of the available power indicator may be performed by the communication/control unit 120 of FIG. 4 or the control unit 710 of FIG. 7.

For example, the wireless power transmission apparatus may take over a control authority of a level over the guaranteed power. If a condition is permitted, the wireless power transmission apparatus may adapt the power level according to the existing control error and may update the target power to a received power of the wireless power reception apparatus.

As an aspect, the wireless power transmission apparatus may adjust the target power by reporting a request for communication (RFC) for a communication. The RFC may be substituted by a term such as request for renegotiation (RFR), request for auxiliary transport (RFA), attention, or the like, and even in the case that the term is different, the function related to the available power indicator or the function related to a wireless power transmission apparatus (PTx)-initiated communication may be the same or similar. The wireless power transmission apparatus may want to decrease the target power based on an ambient charging condition which is deteriorated. Alternatively, the wireless power transmission apparatus may want to increase the target power based on an ambient charging condition which is improved. During such a re-negotiation phase, the wireless power reception apparatus may acknowledge the target power of the wireless power transmission apparatus and adjust an operation mode if it is required.

In another aspect, in the case that a condition is changed during the power transfer phase, the wireless power transmission apparatus may adapt to the target power accordingly. In the case that the target power is changed, the wireless power transmission apparatus may send an alert to the wireless power reception apparatus. This is a selective function for the wireless power reception apparatus but may be an indispensable function for the wireless power transmission apparatus. In addition, the wireless power reception apparatus may request to apply an alert during the negotiation phase to the wireless power transmission apparatus. In the case that an actual power is greater than the target power, the wireless power transmission apparatus may reduce or restrict an actual power transfer. The wireless power transmission apparatus may not reduce an actual power transfer abruptly without a warning or an alert. The operation of transmitting the alert may be performed by a communication/control unit 120 of FIG. 4 or a control unit 710 of FIG. 7.

For another example, the wireless power transmission apparatus may report 'NAK' when unable to maintain the guaranteed power in response to the received power (RP) packet (RPP). This is an exceptional case, and for example, this may include the case that it is in very bad coupling environment, a state of high temperature or a foreign substance is inserted. The NAK report may be performed by the communication/control unit 120 of FIG. 4 or the control unit 710 of FIG. 7. At this time, the wireless power reception apparatus may transmit an end power transfer (EPT) packet, and the value may be 0x08. A transmission of the EPT packet may be performed by the communication/control unit 120 of FIG. 4 or the control unit 710 of FIG. 7.

In this case, the wireless power transmission apparatus restarts the power transmission to perform a detection of foreign substances before the restarting.

As another example, the wireless power reception apparatus may treat the guaranteed power. A load may be provided such that a rectified voltage is high enough in the guaranteed power. In the case that the requested power is equal to or greater than the guaranteed power and the wireless power transmission apparatus disregards a positive control error, the wireless power transmission apparatus may perform a power transmission continuously, and in this case, the EPT packet (0x08) is not required.

Figure 15:
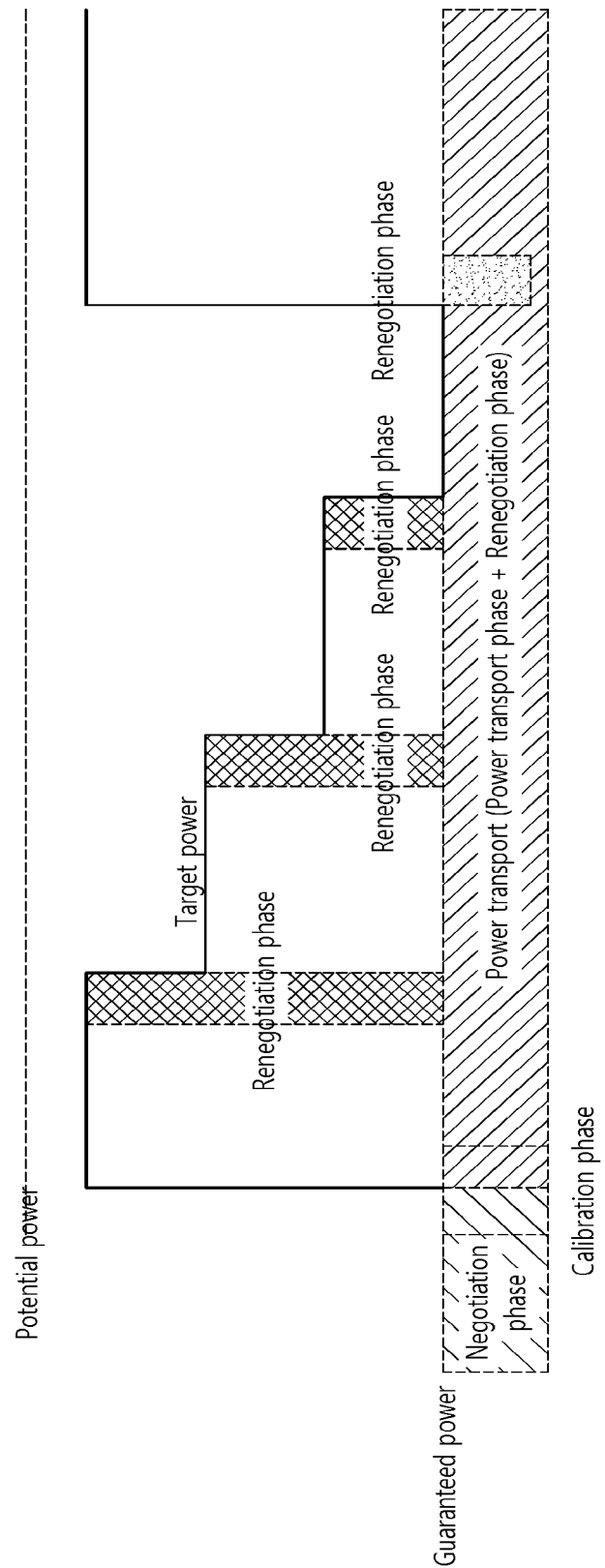
FIG. 15 is a diagram illustrating a procedure in which a power control is performed based on each available power indicator in a power transfer phase according to an example.

FIG. 15 is a diagram illustrating a procedure in which a power control is performed based on each available power indicator in a power transfer phase according to an example.

Referring to FIG. 15, the wireless power transmission apparatus may change (increase or decrease) the target power according to a current ambient charging condition during the power transfer phase and the renegotiation phase. That is, the target power may be changed through the renegotiation phase, and during the renegotiation phase, the power transfer is continued in a previous power level. Such a change of the target power may be performed by the communication/control unit 120 of FIG. 4 or the control unit 710 of FIG. 7.

Figure 16:
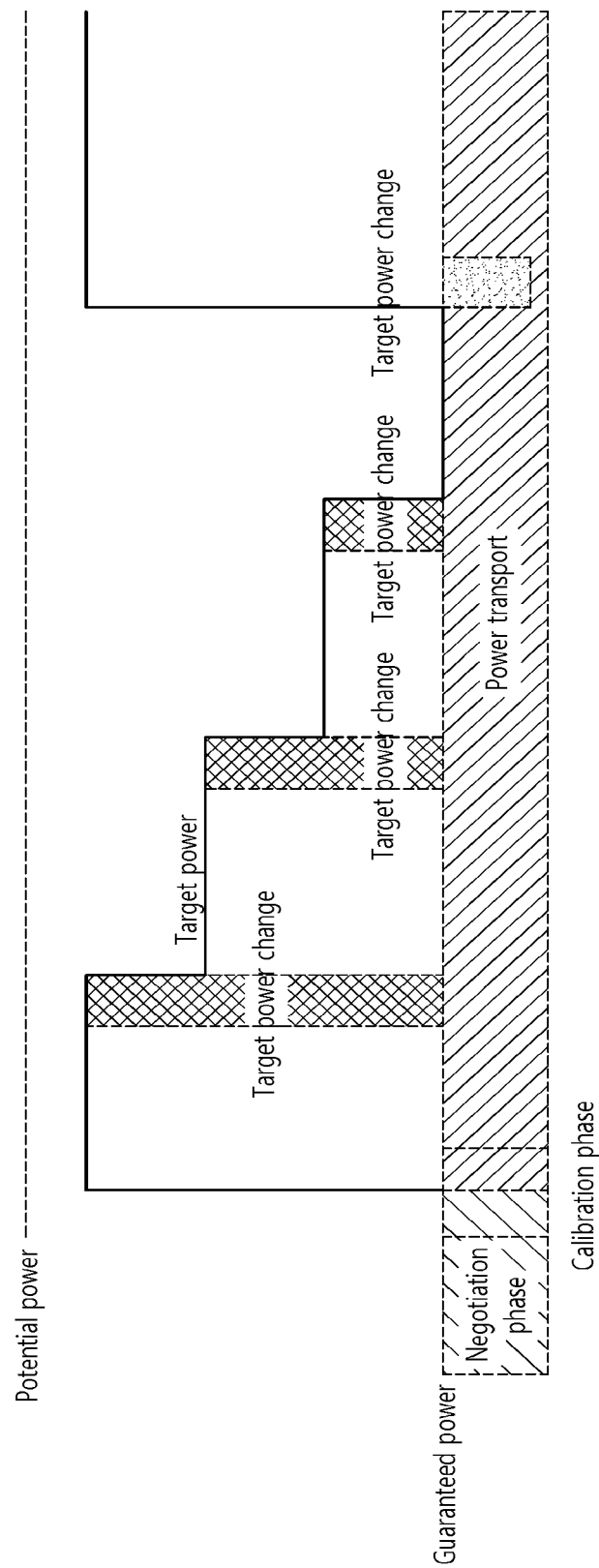
FIG. 16 is a diagram illustrating a procedure in which a power control is performed based on each available power indicator in a power transfer phase according to an example.

FIG. 16 is a diagram illustrating a procedure in which a power control is performed based on each available power indicator in a power transfer phase according to an example.

Referring to FIG. 16, the wireless power transmission apparatus may change (increase or decrease) the available power indicator (i.e., target power) according to a current ambient charging condition during the power transfer.

Based on the communication initiated by the wireless power transmission apparatus, it is described an embodiment that the wireless power transmission apparatus and the wireless power reception apparatus change the available power indicator as below.

The change of the available power indicator according to a first embodiment may include performing, by the wireless power transmission apparatus, an alert for changing of a first available power indicator previously negotiated by transmitting "request for communication (RFC)" to the wireless power reception apparatus in response to RP or CE packet, transmitting, by the wireless power reception apparatus, a response signal indicating being ready to receive a communication of the wireless power transmission apparatus to the wireless power transmission apparatus, transmitting, by the wireless power transmission apparatus, a packet related to a second available power indicator to the wireless power reception apparatus, and transmitting, by the wireless power reception apparatus, ACK to the wireless power transmission apparatus by adjusting an operation mode according to the second available power indicator. The response signal indicating being ready to receive a communication may be poll or ACK packet. In addition, the second available power indicator may include at least one of the potential power, the guaranteed power and the target power.

As an example, in the case that the second available power indicator is the guaranteed power, the wireless power transmission apparatus may transmit a packet related to the guaranteed power to the wireless power reception apparatus after receiving the response signal from the wireless power reception apparatus, and the wireless power reception apparatus may adjust an operation mode according to the guaranteed power. The packet related to the guaranteed power may include a capability packet of the wireless power transmission apparatus indicating a guaranteed power value as shown in FIG. 19.

Figure 20:
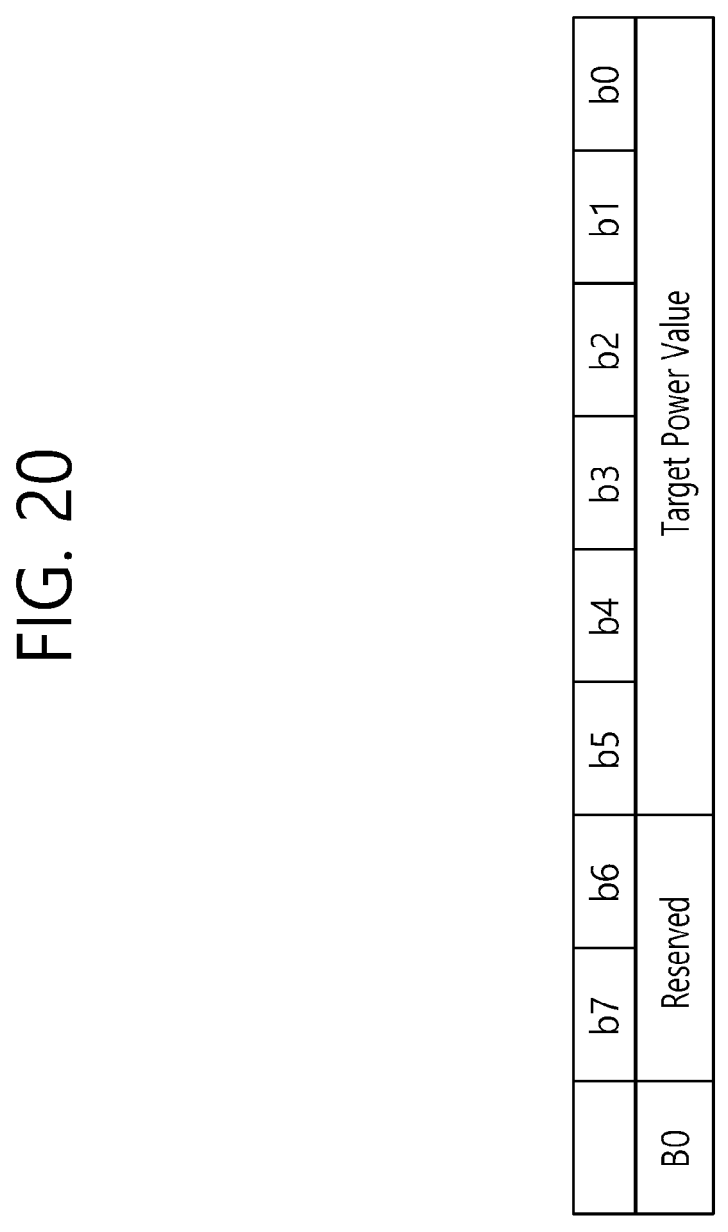

As another example, in the case that the second available power indicator is the target power, the wireless power transmission apparatus may transmit a packet related to the target power to the wireless power reception apparatus after receiving the response signal from the wireless power reception apparatus, and the wireless power reception apparatus may adjust an operation mode according to the target power. The packet related to the target power may include a packet indicating a target power value as shown in FIG. 19 or FIG. 20.

Meanwhile, since the RFC may be related to the renegotiation request (RFR), a change of the available power indicator according to a second embodiment may further include changing a power contract according to the available power indicator by entering the renegotiation phase after the wireless power reception apparatus that receives the RFC in the first embodiment transmits ACK.

The transmission of the RFC, the target power packet and the reception of the response signal may be performed by the communication/control unit 120 of FIG. 4 or the control unit 710 of FIG. 7. The transmission of the response signal may be performed by the communication/control unit 220 of FIG. 4 or the communication unit 890 of FIG. 8. The adjustment of the operation mode according to the target power may be performed by the communication/control unit 220 of FIG. 4 or the control unit 810 of FIG. 8.

2. Signal or Packets of the Wireless Power Transmission Apparatus Used in Relation to the Available Power Indicator (1) Bit Pattern Response In relation to the available power indicator, the wireless power transmission apparatus may transmit a bit pattern response to the wireless power reception apparatus. The bit pattern response is transmitted in response to a type of communication packet (e.g., RP packet) that the wireless power reception apparatus transmits to the wireless power transmission apparatus. A generation and a transmission of the bit pattern response may be performed by the communication/control unit 120 of FIG. 4 or the control unit 710 of FIG. 7.

As an example, the bit pattern response may include ACK, NAK, ND and RFR. For example, the RFR is 8 bits and the value may be set to "00110011"b. Meanwhile, the remaining bit pattern responses may also have a value of ACK('111111'b), NAK('0000000'b) and ND('01010101'b). In this case, it is identified that bit patterns are clearly distinguished between different bit pattern responses.

The wireless power transmission apparatus may request the wireless power reception apparatus to enter the renegotiation phase by transmitting bit pattern response RFR to the wireless power reception apparatus to update the target power. The update of the target power is objected to increase or decrease the required power by reflecting a current ambient charging condition. The protocol related to a transmission procedure of the RFR is as shown in FIG. 17.

Figure 17:
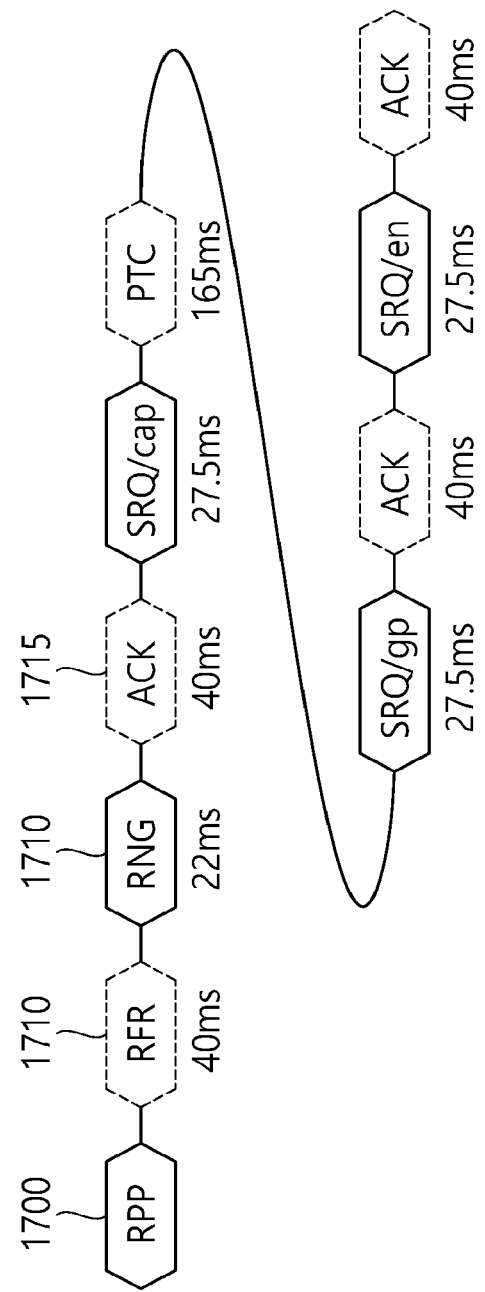
FIG. 17 illustrates a protocol related to a transmission procedure of the RFR according to an embodiment.

FIG. 17 illustrates a protocol related to a transmission procedure of the RFR according to an embodiment.

Referring to FIG. 17, the wireless power transmission apparatus transmits an RFR 1705, which is a bit pattern response, after an RPP 1700 to request the wireless power reception apparatus to enter the renegotiation phase. The transmission of the RFR may be performed by the communication/control unit 120 of FIG. 4 or the communication unit 790 of FIG. 7. Accordingly, the wireless power reception apparatus transmits a renegotiation (RNG) packet 1710 to the wireless power transmission apparatus, and the wireless power transmission apparatus transmits an ACK 1715 to the wireless power reception apparatus. The transmission of the renegotiation packet may be performed by the communication/control unit 220 of FIG. 4 or the communication unit 890 of FIG. 8. The response of the wireless power transmission apparatus may be available not only for the RPP, but the exiting 'NAK' may be reused for the RFR by defining a new response of the wireless power transmission apparatus for a CE packet.

As another example, the bit pattern response may include ACK, NAK, ND and RFC. For example, the RFC is 8 bits and the value may be set to "00110011"b. Meanwhile, the remaining bit pattern responses may also have a value of ACK('111111'b), NAK('0000000'b) and ND('01010101'b). In this case, it is identified that bit patterns are clearly distinguished between different bit pattern responses. That is, since the bit pattern responses are defined as repetitive bit patterns, quick recognition and redundancy and simple implementation become available. For example, 4 bits received by the wireless power reception apparatus exactly matches one of predefined bit patterns, the wireless power reception apparatus may be convinced of the meaning of the bit pattern response after receiving first 4 bits (or on the timing). The wireless power reception apparatus may miss a part of bits but identify a pattern and may correct a flipping bit.

The transmission procedure of the RFC includes sending, by the wireless power transmission apparatus, an alert to the wireless power reception apparatus in response to the RP packet or the CE packet when requiring a matter to communicate, transmitting, by the wireless power reception apparatus, ACK when the wireless power reception apparatus is in a condition to hear the wireless power transmission apparatus, responding, by the wireless power transmission apparatus, with information related to the target power actually supported, and transmitting, by the wireless power reception apparatus, ACK after being accommodated with a new situation of a new target power. Here, the message of the wireless power transmission apparatus and the response and operation of the wireless power reception apparatus are defined according to the message of the wireless power transmission apparatus. For example, with respect to the information related to the target power, the wireless power reception apparatus transmits the ACK after adjusting the operation mode.

As still another example, the bit pattern response may include ACK, NAK, ND and request for auxiliary transport (RFA). For example, the RFA is 8 bits and the value may be set to "00110011"b. Meanwhile, the remaining bit pattern responses may also have a value of ACK('111111'b), NAK ('0000000'b) and ND('01010101'b). In this case, it is identified that bit patterns are clearly distinguished between different bit pattern responses.

The transmission procedure of the RFA includes sending, by the wireless power transmission apparatus, an alert to the wireless power reception apparatus in response to the RP packet when requiring a matter to communicate, transmitting, by the wireless power reception apparatus, ACK when the wireless power reception apparatus is in a condition to hear the wireless power transmission apparatus, responding, by the wireless power transmission apparatus, with information related to the target power actually supported, and transmitting, by the wireless power reception apparatus, ACK after being accommodated with a new situation of a new target power. For the compatibility with the legacy Qi wireless power reception apparatus, the wireless power reception apparatus may transmit the RFA only in response to the RP packet in mode 0.

(2) RFA Packet of the Wireless Power Transmission Apparatus

Figure 18:
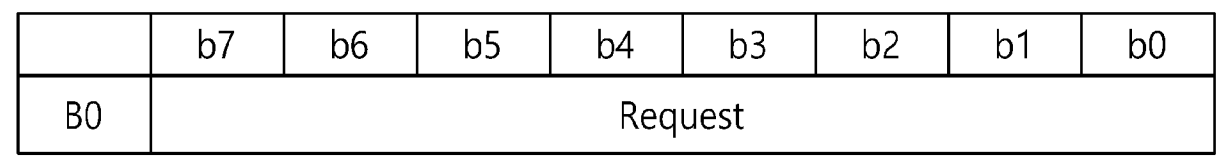

The RFA may be defined by an RFA packet which is indicated by a header for the RFA as shown in FIG. 18. For example, when a request field is set to '11111111'b, the RFA indicates a request of the wireless power transmission apparatus for an auxiliary data transport. Here, an auxiliary transport includes a data transport and the auxiliary data transport. The header for data transmission indicates a type of data packet. The header for auxiliary data transport indicates that the corresponding packet is auxiliary data which may be interpreted by a higher layer application.

(3) Capability Packet of the Wireless Power Transmission Apparatus

The available power indicator may be transmitted with being included in a capability packet of the wireless power transmission apparatus. A transmission of the available power indicator and a transmission of the capability packet may be performed by the communication/control unit 120 of FIG. 4 or the communication unit 790 of FIG. 7.

FIG. 19 illustrates a structure of the capability packet of the wireless power transmission apparatus including an available power indicator according to an embodiment.

Referring to FIG. 19, the capability packet is 3 bytes, and the first byte B0 includes a power class and a (target) guaranteed power value, and the second byte B1 includes a reserved and a potential power value, and includes a reserved, WPID and Not Res Sens.

In the negotiation phase, the (target) guaranteed power value may indicate an output power or an amount of output power of a reference wireless power reception apparatus that the wireless power transmission apparatus ensures a possibility in any times during the power transfer phase.

In the renegotiation phase, the (target) guaranteed power value may mean an output power or an amount of output power of the wireless power reception apparatus that the wireless power transmission apparatus wants renegotiation under a current ambient condition.

(4) Target Power Packet of the Wireless Power Transmission Apparatus

The target power value may be transmitted with being included in the target power packet of the wireless power transmission apparatus. A transmission of the target power packet may be performed by the communication/control unit 120 of FIG. 4 or the communication unit 790 of FIG. 7.

FIG. 20 illustrates a structure of the target power packet of the wireless power transmission apparatus according to an embodiment.

Referring to FIG. 20, the target power packet is 1 byte, and a part thereof may be reserved bit and the remaining part thereof may be a field indicating a target power value. For example, the reserved bit may be 2 bits and the field indicating a target power value may be 6 bits. The target power value may mean an output power or an amount of output power of the wireless power reception apparatus that the wireless power transmission apparatus provides during the power transfer phase. The target power value is dynamic and may be changed during the power transfer phase. The supported target power may be dependent upon the condition that the wireless power transmission apparatus operates.

(5) General Request Packet (GRP) and Specific Request Packet (SRP)

The wireless power reception apparatus may use a general request packet or a specific request packet for obtaining a value of a currently available guaranteed power (or target power). A generation and a transmission of the general or specific request packet may be performed by the communication/control unit 220 of FIG. 4 or the communication unit 890 of FIG. 8.

As an example, the wireless power reception apparatus may read the capability packet of the wireless power transmission apparatus by using the general request packet. Here, the target power value may be the same as the guaranteed power value which is included in the capability packet. Alternatively, the wireless power reception apparatus may use the general request packet for obtaining information for the target power which is supported.

As another example, the wireless power reception apparatus may read the target power value (or guaranteed power value) of the wireless power transmission apparatus. The specific request packet is used for obtaining an answer of yes/no, and with respect to the available power indicator, may be used for requesting such that the target power is not abruptly decreased but uniformly maintained.

(6) Response Packet of the Wireless Power Reception Apparatus

With respect to the available power indicator, a response packet of the wireless power reception apparatus may be used. A generation and a transmission of the response packet of the wireless power reception apparatus may be performed by the communication/control unit 220 of FIG. 4 or the communication unit 890 of FIG. 8.

Figure 21:
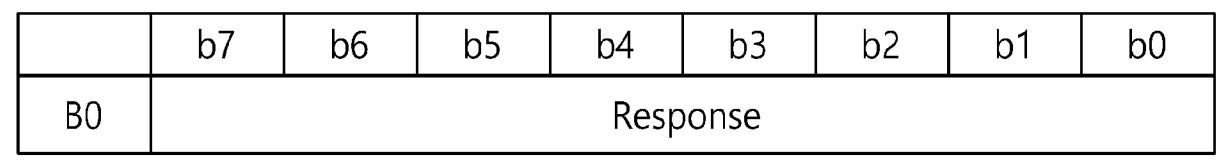

FIG. 21 illustrates a structure of the response packet of the wireless power reception apparatus according to an embodiment.

Referring to FIG. 21, the response packet is 1 byte, and the whole 8 bits may be a response field indicating a multiple response.

As an example, when the response field is set to '11111111'b, the response packet may indicate ACK, when the response field is set to '00000000'b, the response packet may indicate NAK, and when the response field is set to '01010101'b, the response packet may indicate ND.

As another example, when the response field is set to '11111111'b, the response packet may indicate ACK, when the response field is set to '00000000'b, the response packet may indicate NAK, when the response field is set to '01010101'b, the response packet may indicate ND, and when the response field is set to '00110011'b, the response packet may indicate RFA.

(7) Response Packet of the Wireless Power Transmission Apparatus

Figure 22:
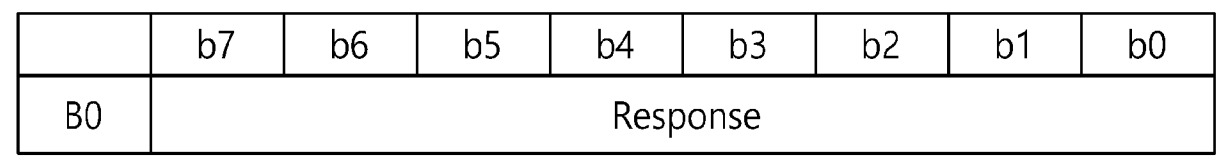

With respect to the available power indicator, a response packet of the wireless power transmission apparatus may be used. A generation and a transmission of the response packet of the wireless power transmission apparatus may be performed by the communication/control unit 120 of FIG. 4 or the communication unit 790 of FIG. 7. FIG. 22 illustrates a structure of the response packet of the wireless power transmission apparatus according to an embodiment.

Referring to FIG. 22, the response packet is 1 byte, and the whole 8 bits may be a response field indicating a multiple response. This is the same structure as the response packet of the wireless power reception apparatus.

As an example, when the response field is set to '11111111'b, the response packet may indicate ACK, when the response field is set to '00000000'b, the response packet may indicate NAK, when the response field is set to '01010101'b, the response packet may indicate ND, and when the response field is set to '00110011'b, the response packet may indicate RFA.

3. Communication Method Initiated by the Wireless Power Transmission Apparatus (PTx-Initiated) Related to the Available Power Indicator A communication initiated by the wireless power transmission apparatus may be used the functions of authentication and power management. In the authentication initiated by the wireless power transmission apparatus, the wireless power transmission apparatus is required to start the authentication as an initiator by transmitting data stream of a request message on the timing requested to the wireless power transmission apparatus itself.

In the power management initiated by the wireless power transmission apparatus, the wireless power transmission apparatus is required to renegotiate a power level dependent upon a charging environment on the timing requested to the wireless power transmission apparatus itself.

Accordingly, the communication initiated by the wireless power transmission apparatus needs to provide a means for requesting an attention from the wireless power reception apparatus. That is, when the wireless power transmission apparatus is intended to transmit data to the wireless power reception apparatus, the above-described bit pattern response (i.e., RFR, RFC and RFA) may be used. Through the bit pattern response, an opportunity is given to transmit data to the wireless power transmission apparatus. However, even in this case, the wireless power reception apparatus may allow/disallow the request of the wireless power transmission apparatus and may keep a control of the communication.

In order for the wireless power transmission apparatus to transmit data, a protocol therefor needs to be defined. For example, in the communication initiated by the wireless power transmission apparatus, for data transmission, an auxiliary transport or an auxiliary data transport protocol may be used.

Figure 23:
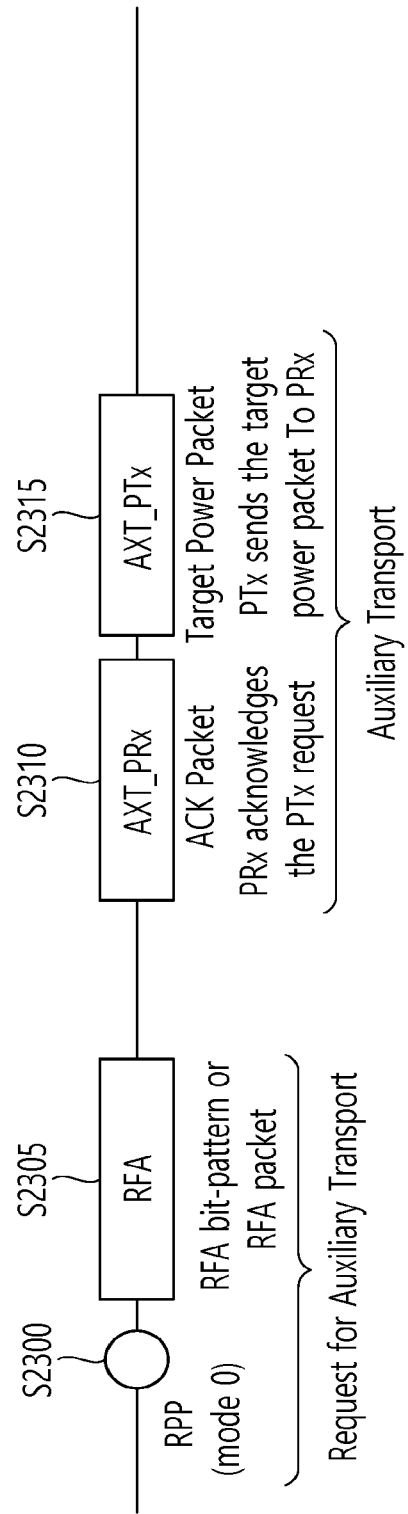
FIG. 23 is a flowchart for the wireless power transmission apparatus to transmit information related to the available power indicator based on the auxiliary transport protocol according to an embodiment.

FIG. 23 is a flowchart for the wireless power transmission apparatus to transmit information related to the available power indicator based on the auxiliary transport protocol according to an embodiment.

Referring to FIG. 23, the auxiliary transport protocol may be distinguished by step (steps S2300 and S2305) of requesting, by the wireless power transmission apparatus, an auxiliary transport and step (steps S2310 and S2315) of performing the auxiliary transport by the auxiliary transport request, largely.

First, in the step of requesting the auxiliary transport, the wireless power reception apparatus transmits an RP packet (RPP) to the wireless power transmission apparatus (step, S2300). A generation and a transmission of the RP packet may be performed by the communication/control unit 220 of FIG. 4 or the communication unit 890 of FIG. 8. The wireless power transmission apparatus transmits the RFA to the wireless power reception apparatus (step, S2305). A generation and a transmission of the RFA packet may be performed by the communication/control unit 120 of FIG. 4 or the communication unit 790 of FIG. 7. The RFA may be the bit pattern response or the RFA packet. The purpose of the wireless power transmission apparatus to transmit the RFA may be to transmit data of the wireless power transmission apparatus to the wireless power reception apparatus by using the communication initiated by the wireless power transmission apparatus. At this time, the data that the wireless power transmission apparatus is intended to transmit may include a packet related to the available power indicator. For example, the packet related to the available power indicator may be information related to at least one of the target power, the guaranteed power and the potential power. In this case, the purpose of the wireless power transmission apparatus to transmit the RFA may be to request a renegotiation for changing the available power indicator (e.g., increase or decrease of the guaranteed power).

Next, in the step of performing the auxiliary transport, the wireless power reception apparatus that receives the RFA transmits a response packet for the RFA to the wireless power transmission apparatus (step, S2310). A generation and a transmission of the response packet to the RFA may be performed by the communication/control unit 220 of FIG. 4 or the communication unit 890 of FIG. 8. As an example, the response packet for the RFA may be ACK packet indicating that the wireless power reception apparatus identifies a request of the wireless power transmission apparatus. As another example, the response packet for the RFA may indicate that the wireless power reception apparatus is in the state of hearing the wireless power transmission apparatus.

Later, the wireless power transmission apparatus transmits a packet for the available power indicator to the wireless power reception apparatus (step, S2315). A generation and a transmission of the packet for the available power indicator may be performed by the communication/control unit 120 of FIG. 4 or the communication unit 790 of FIG. 7.

Figure 24A:
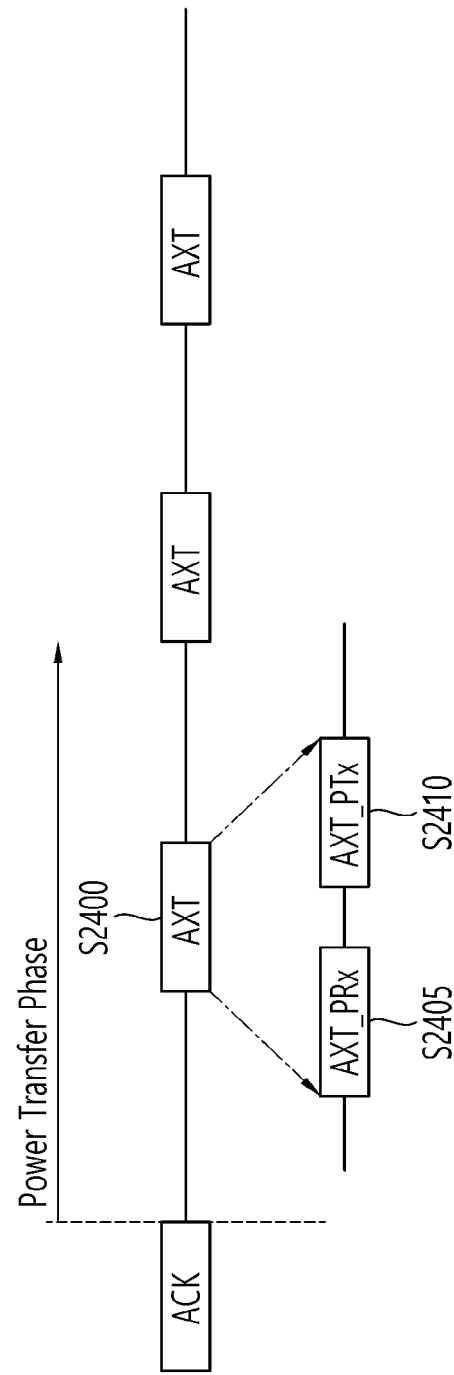
FIG. 24a illustrates an ATX (or ATD) step performing the auxiliary transport in detail according to an embodiment.

FIG. 24a illustrates an ATX (or ATD) step performing the auxiliary transport in detail according to an embodiment.

Referring to FIG. 24a, in the ATX (or ATD) step (S2400) that performs the auxiliary transport, two steps are paired, which include a step (ATX_PRx; S2405) of performing the auxiliary transport by the wireless power reception apparatus and a step (ATX_PTx; S2410) of performing the auxiliary transport by the wireless power transmission apparatus. In the ATX_PRx, it is transmitted auxiliary data or an auxiliary data packet, or a response (ACK/NAK/RFA) packet of the wireless power reception apparatus. A generation and a transmission of the auxiliary data or the auxiliary data packet, or the response (ACK/NAK/RFA) packet of the wireless power reception apparatus may be performed by the communication/control unit 220 of FIG. 4 or the communication unit 890 of FIG. 8.

In the ATX_PTx, it is transmitted auxiliary data or an auxiliary data packet, a response (ACK/NAK/RFA) packet, or a bit pattern response of the wireless power transmission apparatus. The ATX may be called as auxiliary data transport (ADT) or auxiliary data control transport (ADC). A generation and a transmission of the auxiliary data packet, the response (ACK/NAK/RFA) packet, or the bit pattern response of the wireless power transmission apparatus may be performed by the communication/control unit 120 of FIG. 4 or the communication unit 790 of FIG. 7.

FIG. 24b illustrates an ATX (or ATD) step performing the auxiliary transport in detail according to another embodiment.

Referring to FIG. 24b, in the ATX (or ATD) step (S2420) that performs the auxiliary transport, two steps are paired, which include a step (S2525) of performing the auxiliary transport by the wireless power transmission apparatus (or wireless power reception apparatus) and a step (S2530) of transmitting ACK/NAK or a bit pattern response by the wireless power reception apparatus (wireless power transmission apparatus). A header of the ADT packet may indicate header A or header B. The ADT may be transmitted in a period of 500 ms, for example, in the case that the CE value is 0 or close to 0). Alternatively, in the case that the CE value is a predetermined value or more, the ADT transmission may be omitted. A single ADT (ADT data pair) may be transmitted between two adjacent CE packets.

Figure 25:
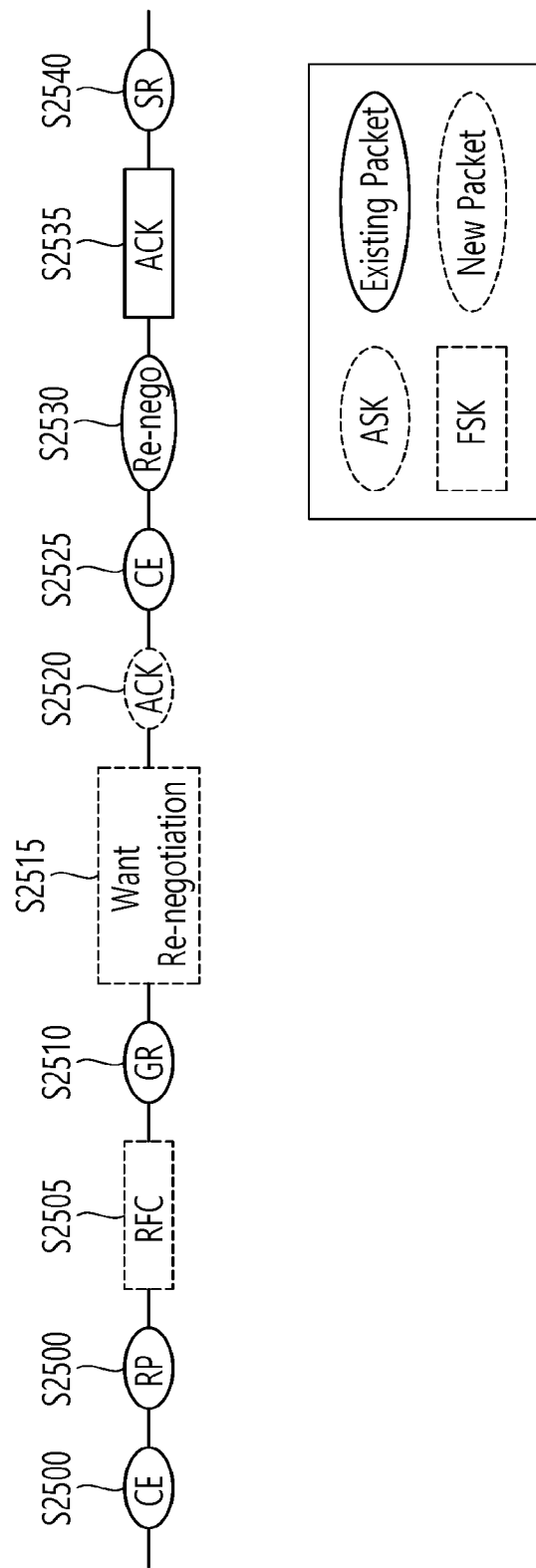
FIG. 25 is a flowchart for the wireless power transmission apparatus to transmit information related to the available power indicator based on the auxiliary transport protocol according to another embodiment.

FIG. 25 is a flowchart for the wireless power transmission apparatus to transmit information related to the available power indicator based on the auxiliary transport protocol according to another embodiment.

Referring to FIG. 25, the wireless power reception apparatus transmits a CE packet and an RP packet to the wireless power transmission apparatus (step, S2500). A generation and a transmission of the CE packet and the RP packet may be performed by the communication/control unit 220 of FIG. 4 or the communication unit 890 of FIG. 8. The wireless power transmission apparatus transmits a bit pattern response RFC to the wireless power reception apparatus (step, S2505). Accordingly, the wireless power transmission apparatus gets an attention of the wireless power reception apparatus and requests a communication start by the wireless power transmission apparatus. In this embodiment, it is assumed that the wireless power transmission apparatus transmits the bit pattern response RFC for the purpose of changing the available power indicator. In this case, the wireless power transmission apparatus performs a changing procedure of the available power indicator in the renegotiation phase. Depending on an embodiment, the RFC may be replaced by RFA, RFR or ATN.

Meanwhile, the wireless power reception apparatus inquires the reason of starting communication by the wireless power transmission apparatus by transmitting a response packet (general request (GR) packet) for the RFC to the wireless power transmission apparatus (step, S2510). This is also called a poll. A generation and a transmission of the response packet may be performed by the communication/control unit 220 of FIG. 4 or the communication unit 890 of FIG. 8.

Figure 26:
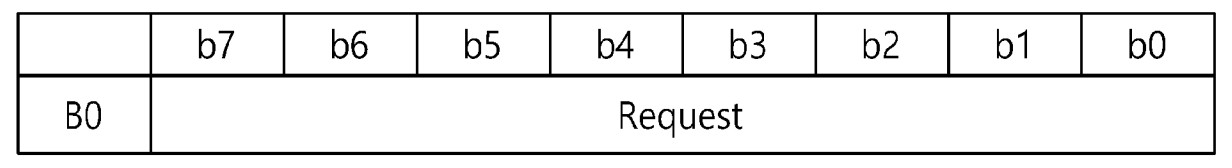

As an example, GR packet may be used as the response packet, and the GR packet may have the structure shown in FIG. 26, for example. Referring to FIG. 26, the GR packet includes a request field. The wireless power reception apparatus transmits the GR packet including a request field indicating a reason for attention (RA) to the wireless power transmission apparatus and polls the reason of attention request. The request field may be a header of the RA packet.

Referring to FIG. 25 again, the wireless power transmission apparatus informs that renegotiation is required to the wireless power reception apparatus by reason of a change of the available power indicator (step, S2515). For step S2515, a separate RA packet may be used. Here, the RA packet may have a structure shown in FIG. 27. Referring to FIG. 27, the RA packet is 1 byte and may indicate a reason for an attention request, and for example, when b0=1, the RA packet may indicate renegotiation, and when b1=1, the RA packet may indicate ADT data stream (e.g., authentication) transmission. In addition, b2 to b7 may be reserved bits. The RA may also be called a reason for request (RR). A generation and a transmission of the RA packet may be performed by the communication/control unit 120 of FIG. 4 or the communication unit 790 of FIG. 7.

Figure 28:
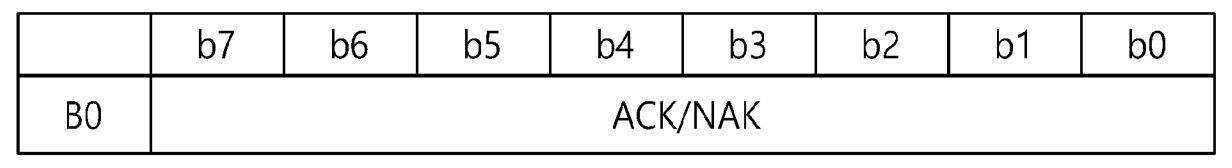

Referring to FIG. 25 again, the wireless power reception apparatus determines whether to accept the renegotiation request and transmits ACK packet as shown in FIG. 28 as a sign of accept (step, S2520), and transmits CE packet for a progressing power transfer to the wireless power transmission apparatus (step, S2525). The ACK/NAK packet is 1-byte information, and when the value indicates '11111111'b, it is indicated ACK (RA packet or ADT data packet is received without any problem, and when the value indicates '00000000'b, it is indicated NAK (an error occurs when receiving RA packet or ADT data packet).

Later, the wireless power reception apparatus transmits a renegotiation packet to the wireless power transmission apparatus (step, S2530). In response to it, the wireless power transmission apparatus responds with ACK (step, S2535), and the wireless power reception apparatus transmits a specific request packet to the wireless power transmission apparatus to receive a required packet (step, S2540). Later, the wireless power transmission and reception apparatuses enter the renegotiation phase and change the available power indicator after changing required packets.

Meanwhile, the communication initiated by the wireless power transmission apparatus may also be performed in a way that the wireless power reception apparatus inquires whether there is data stream to send to the wireless power transmission apparatus.

Figure 29:
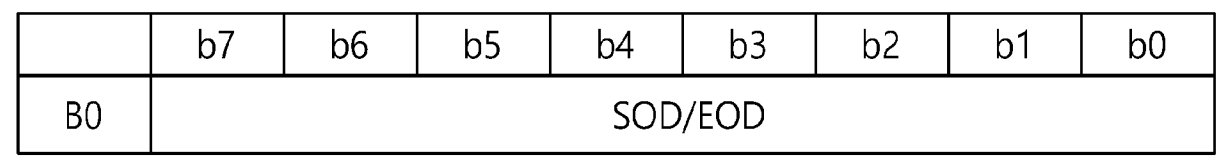

For this, the wireless power reception apparatus may transmit ADT data packet including a start of data stream (SOD) or an end of data stream (EOD). For example, in a start of the ADT data stream, the start of data stream (SOD) packet may be added. Alternatively, in an end of the data stream, the EOD packet may be added. The structure of the SOD/EOD packet may be as shown in FIG. 29, for example.

A generation and a transmission of the ADT data packet including the SOD or the EOD may be performed by the communication/control unit 220 of FIG. 4 or the communication unit 890 of FIG. 8.

Figure 30:
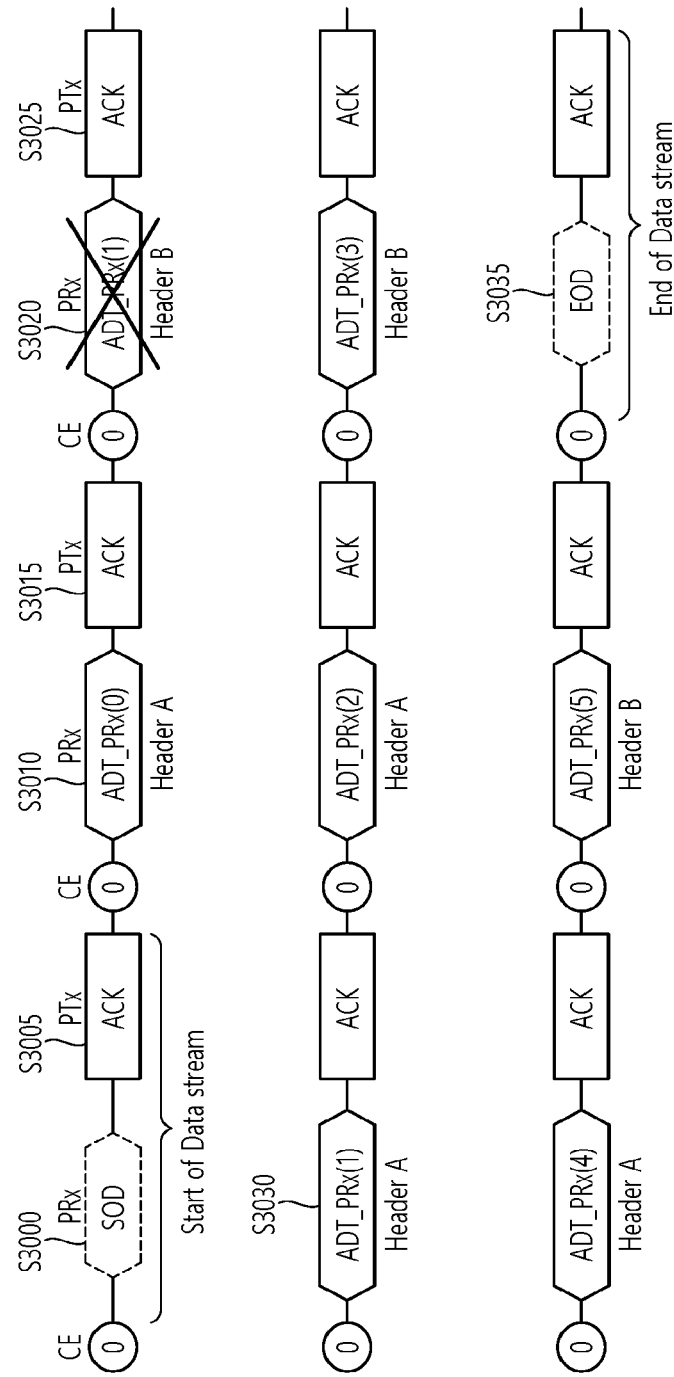
FIG. 30 illustrates an ADT data transmission procedure according to an embodiment.

FIG. 30 illustrates an ADT data transmission procedure according to an embodiment. This is the procedure that the wireless power reception apparatus transmits the ADT data to the wireless power transmission apparatus by using ADT transport protocol.

Referring to FIG. 30, in the power transfer phase, the wireless power reception apparatus transmits CE packet to the wireless power transmission apparatus, and subsequently, transmits SOD to the wireless power transmission apparatus (step, S3000). When the wireless power transmission apparatus receives it successfully, in response to it, the wireless power reception apparatus transmits ACK which is a bit pattern response (step, S3005). The wireless power reception apparatus performs a role of master that transmits a message to the wireless power transmission apparatus.

The wireless power reception apparatus transmits a $0^{th}$ ADT data packet ADT_PRx(0) successfully (step, S3010), and then, receives ACK (step, S3015). The process of transmitting the ADT data packet may be included in the power transfer phase, and in this case, the CE packet may be transmitted from the wireless power reception apparatus to the wireless power transmission apparatus in the middle of the ADT data packet or periodically.

Meanwhile, when the wireless power transmission apparatus fails to receive a first ADT data packet ADT_PRx(1) (step, S3020), the wireless power transmission apparatus transmits NAK to the wireless power reception apparatus (step, S3025). Later, the wireless power reception apparatus retransmits the first ADT data packet ADT_PRx(1) (step, S3030). After repeating the ADT packet transmission sequence, the wireless power reception apparatus transmits the lastly remaining 5th ADT data packet ADT_PRx(5) successfully, and then receives NAK. In response to it, the wireless power reception apparatus transmits the EOD successfully (step, S3035) and receives ACK, and accordingly, terminates the transport procedure of the ADT data.

In the method and the wireless power transmission apparatus or the method and the wireless power reception apparatus according to the embodiments of the present invention, since not all elements or steps are essential, the method and the wireless power transmission apparatus or the method and the wireless power reception apparatus may perform a part or the whole of the elements or steps described above. In addition, the embodiments of the method and the wireless power transmission apparatus or the method and the wireless power reception apparatus may be performed in combination. Furthermore, the elements and the steps are not necessarily performed in the order as described above, but it is also available that the step described later may be performed first.

The description so far is just an exemplary description of the technical concept of the present invention, and various modification and alteration are available by those skilled in the art without departing from the substantial characteristics of the present invention. Accordingly, the embodiments described above may be implemented separately or in combination.

Therefore, the embodiments described in the present invention is not to limit the technical concept of the present invention but to describe, and the scope of the technical concept of the present invention is not limited by the embodiments. It is interpreted that the scope of the present invention should be interpreted by the claims below and all of the equivalent technical concepts are included in the scope of the present invention.

What is claimed is:

1. A wireless power transmitter comprising:
    a power conversion unit configured to transfer wireless power to a wireless power receiver by forming magnetic coupling with the wireless power receiver; and
    a communication/control unit configured to communicate with the wireless power receiver to control transmission of the wireless power and to perform transmission or reception of data,
    wherein the communication/control unit is further configured to:
    set a target power level based on an operation condition,
    receive, from the wireless power receiver, a received power packet (RPP) which informs a value of the wireless power received by the wireless power receiver,
    transmit a bit pattern to the wireless power receiver in response to the RPP, the bit pattern requesting communication initiated by the wireless power transmitter,
    receive, from the wireless power receiver, a response packet to allow the communication initiated by the wireless power transmitter,
    transmit, to the wireless power receiver, information informing the target power level in response to the response packet,
    negotiate a guaranteed power level adjusted by the wireless power receiver, wherein the target power level is kept equal to or larger than the guaranteed power level.

2. The wireless power transmitter of claim 1, wherein the target power level is kept equal to or lower than a potential power level which is the highest power provided by the wireless power transmitter.

3. The wireless power transmitter of claim 1, wherein the guaranteed power level is adjusted by the wireless power receiver based on the target power level.

4. The wireless power transmitter of claim 1, wherein the information informing the target power level is 6 bits.

5. The wireless power transmitter of claim 1, wherein setting a target power level based on an operation condition includes increasing or decreasing the target power level based on the operation condition.

6. A method of data transmission performed by a wireless power transmitter, the method comprising:
    transferring wireless power to a wireless power receiver by using magnetic coupling between the wireless power transmitter and the wireless power receiver;
    setting a target power level based on an operation condition;
    receiving, from the wireless power receiver, a received power packet (RPP) which informs a value of the wireless power received by the wireless power receiver;
    transmitting a bit pattern to the wireless power receiver in response to the RPP, the bit pattern requesting communication initiated by the wireless power transmitter;
    receiving, from the wireless power receiver, a response packet to allow the communication initiated by the wireless power transmitter;
    transmitting, to the wireless power receiver, information informing the target power level in response to the response packet; and
    negotiating a guaranteed power level adjusted by the wireless power receiver, wherein the target power level is kept equal to or larger than the guaranteed power level.

7. The method of claim 6, wherein the target power level is kept equal to or lower than a potential power level which is the highest power provided by the wireless power transmitter.

8. The method of claim 6, wherein the guaranteed power level is adjusted by the wireless power receiver based on the target power level.

9. The method of claim 6, wherein the information informing the target power level is 6 bits.

10. The method of claim 6, wherein setting a target power level based on an operation condition includes increasing or decreasing the target power level based on the operation condition.

11. A wireless power receiver comprising:
    a power pickup unit configured to receive wireless power from a wireless power transmitter by using magnetic coupling between the wireless power transmitter and the wireless power receiver; and
    a communication/control unit configured to control the wireless power and to perform transmission or reception of data based on communication with the wireless power transmitter,
    wherein the communication/control unit is further configured to:
    transmit, to the wireless power transmitter, a received power packet (RPP) which informs a value of the wireless power received by the wireless power receiver,
    receive a bit pattern from the wireless power transmitter in response to the RPP, the bit pattern being used for the wireless power transmitter to request communication initiated by the wireless power transmitter,
    transmit, to the wireless power transmitter, a response packet to allow the communication initiated by the wireless power transmitter,
    receive, from the wireless power transmitter, information informing the target power level in response to the response packet,
    adjust a guaranteed power level adjusted by the wireless power receiver, wherein the target power level is kept equal to or larger than the guaranteed power level,
    negotiate the guaranteed power level with the wireless power transmitter.

12. The wireless power receiver of claim 11, wherein the target power level is kept equal to or lower than a potential power level which is the highest power provided by the wireless power transmitter.

13. The wireless power receiver of claim 11, wherein the guaranteed power level is adjusted by the wireless power receiver based on the target power level.

14. The wireless power receiver of claim 11, wherein the information informing the target power level is 6 bits.

15. A method of data reception performed by a wireless power receiver, the method comprising:
    receiving wireless power from a wireless power transmitter by using magnetic coupling between the wireless power transmitter and the wireless power receiver;
    transmitting, to the wireless power transmitter, a received power packet (RPP) which informs a value of the wireless power received by the wireless power receiver;
    receiving a bit pattern from the wireless power transmitter in response to the RPP, the bit pattern being used for the wireless power transmitter to request communication initiated by the wireless power transmitter;
    transmitting, to the wireless power transmitter, a response packet to allow the communication initiated by the wireless power transmitter:

receiving, from the wireless power transmitter, information informing the target power level in response to the response packet;

adjusting a guaranteed power level adjusted by the wireless power receiver, wherein the target power level is kept equal to or larger than the guaranteed power level; and negotiating the guaranteed power level with the wireless power transmitter.

16. The method of claim 15, wherein the target power level is kept equal to or lower than a potential power level which is the highest power provided by the wireless power transmitter.

17. The method of claim 15, wherein the guaranteed power level is adjusted by the wireless power receiver based on the target power level.

18. The method of claim 15, wherein the information informing the target power level is 6 bits.

* * * * *